(12) United States Patent
Kim et al.

(10) Patent No.: US 8,666,523 B2
(45) Date of Patent: Mar. 4, 2014

(54) DEVICE, METHOD AND TIMELINE USER INTERFACE FOR CONTROLLING HOME DEVICES

(75) Inventors: Jihwan Kim, Seoul (KR); Hyorim Park, Seoul (KR)

(73) Assignee: LG Electronics, Inc., Seoul (KR)

( * ) Notice: Subject to any disclaimer, the term of this patent is extended or adjusted under 35 U.S.C. 154(b) by 0 days.

(21) Appl. No.: 13/540,294

(22) Filed: Jul. 2, 2012

(65) Prior Publication Data

US 2013/0231758 A1    Sep. 5, 2013

Related U.S. Application Data

(60) Provisional application No. 61/606,469, filed on Mar. 4, 2012.

(30) Foreign Application Priority Data

Apr. 17, 2012  (KR) .......................... 10-2012-0039730

(51) Int. Cl.
*G05B 15/02*    (2006.01)
(52) U.S. Cl.
USPC ...... 700/90; 700/9; 700/17; 700/83; 713/310; 715/716

(58) Field of Classification Search
USPC .............. 700/9, 17, 83, 90; 713/310; 715/716
See application file for complete search history.

(56) References Cited

U.S. PATENT DOCUMENTS

| | | | |
|---|---|---|---|
| 6,828,992 B1 | 12/2004 | Freeman et al. | |
| 8,001,219 B2 | 8/2011 | Moorer et al. | |
| 2003/0229404 A1* | 12/2003 | Howard et al. | 700/17 |
| 2006/0176240 A1 | 8/2006 | Nozaki et al. | |
| 2007/0279389 A1 | 12/2007 | Hoch et al. | |
| 2008/0134036 A1* | 6/2008 | Kapur et al. | 715/716 |
| 2009/0077397 A1 | 3/2009 | Shnekendorf et al. | |
| 2010/0023865 A1 | 1/2010 | Fulker et al. | |
| 2011/0062143 A1 | 3/2011 | Satanek | |

* cited by examiner

*Primary Examiner* — Tejal Gami
(74) *Attorney, Agent, or Firm* — Birch, Stewart, Kolasch & Birch, LLP

(57) ABSTRACT

A device, method and timeline user interface for controlling home devices are provided. The method for controlling home devices includes displaying a virtual track on a display unit of a control device, displaying an indicator indicating operation information of a home device connected to the control device through the network along the virtual track, moving the indicator along the virtual track based on a user input; and controlling an operation time of the home device based on the location of the indicator along the virtual track.

24 Claims, 23 Drawing Sheets

(a)

(b)

(c)

(a)

(b)

(c)

(a)

(b)

(c)

(a)

(b)

(a)

(b)

DEVICE, METHOD AND TIMELINE USER INTERFACE FOR CONTROLLING HOME DEVICES

This application claims the priority benefit of U.S. Provisional Patent Application No. 61/606,469, filed on Mar. 4, 2012 and Korean Patent Application No. 10-2012-0039730 filed on Apr. 17, 2012, which is hereby incorporated by reference as if fully set forth herein.

BACKGROUND OF THE INVENTION

1. Field of the Invention

The present invention relates to a device, method and timeline user interface (UI) for controlling home devices, and more particularly, to a device, method and timeline UI for controlling home devices connected via a network.

2. Discussion of the Related Art

With recent development of network technology, electric/electronic devices used in homes and offices are connected through a wired/wireless network such that the devices can be operated through other devices. Particularly, a network constructed to remotely control devices such as home appliances is called a home network. A user can control home appliances using this home network in the house or remotely using a remote controller or a portable terminal.

In spite of the development of home network technology, conventional devices for controlling home devices do not provide an intuitive control means to the user. Therefore, the user needs a means capable of controlling the home devices more intuitively and conveniently.

SUMMARY OF THE INVENTION

Accordingly, the present invention is directed to a device and method for controlling home devices more intuitively and conveniently. Especially, the present invention provides a device and method for controlling home devices to allow a user to intuitively control an operation time or an operation mode of a home device connected to a control device even when the control device is performing an operation by comparing the operation time or operation mode of the home device with a progress state of the operation being performed or to be performed by the control device.

In an aspect of the present invention, a method for controlling home devices connected through a network includes: displaying a virtual track on a display unit of a control device, the virtual track corresponding to a timeline including at least one of a start time and an end time of an operation being performed or to be performed by the control device; displaying an indicator indicating operation information of a home device connected to the control device through the network along the virtual track, the operation information comprising at least one of an operation start time and an operation end time of the home device; moving the indicator along the virtual track based on a user input; and controlling an operation time of the home device based on the location of the indicator along the virtual track, the operation time comprising at least one of the operation start time and the operation end time of the home device.

In another aspect of the present invention, a control device for controlling operations of home devices connected to a network includes: a communication unit transmitting/receiving data to/from the home devices connected to the network; a processor for controlling operations of the control device; and a display unit for displaying an image based on a command of the processor, wherein the processor is configured to display a virtual track corresponding to a timeline including at least one of a start time and an end time of an operation being performed or to be performed by the control device on the display unit, to display an indicator indicating operation information including at least one of an operation start time and an operation end time of a home device connected to the control device through the network along the virtual track, and to control an operation time including at least one of the operation start time and the operation end time of the home device based on a location of the indicator along the virtual track, adjusted by user input.

In another aspect of the present invention, a timeline user interface (UI) displayed on a control device to control operations of home devices connected to a network, the timeline UI includes: a virtual track displayed on a display unit of the control device and corresponding to a timeline including at least one of a start time and an end time of an operation being performed or to be performed by the control device; and an indicator displayed on the virtual track and indicating operation information including at least one of an operation start time and an operation end time of a home device connected to the control device through the network, wherein an operation time including at least one of the operation start time and the operation end time of the home device is controlled based on a location of the indicator on the virtual track, adjusted according to a user input.

ADVANTAGEOUS EFFECTS

According to an embodiment of the present invention, a user can easily check operation information about a home device connected via a network through a timeline UI of the control device and easily control the operation of the home device through the control device.

According to an embodiment of the present invention, the user can intuitively recognize the relationship between an operating time of an operation being executed or to be executed by the control device and an operating time of a home device and control the operation of the home device or control device on the basis of the relationship.

According to an embodiment of the present invention, the user can conveniently control an operation start time, operation end time and operation mode of a home device through the timeline UI of the control device. In addition, the user can control the home device by directly comparing the operation start time, operation end time and operation mode of the home device with an operating time and the progress of an operation being executed by the control device.

According to another embodiment of the present invention, the control device can receive traffic information such as a train arrival time, bus arrival time, etc. through a network and display the traffic information on the timeline UI, and the user can check the traffic information in connection with an operating time of the control device and an operating time of the home device.

According to another embodiment of the present invention, when indicators which respectively indicate an operating time of the control device, an operating time of a home device and a occurrence expectation time of a specific event and are divided into a plurality of regions on the basis of overlapping portions of the indicators, the timeline UI can apply different display attributes to regions of the indicators. Accordingly, the user can intuitively recognize the relationship between an operating time of each device and an occurrence expectation time of an event.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Although the terms used in the present invention are selected from generally known and used terms, the terms may be changed according to the intention of an operator, customs, or the advent of new technology. Some of the terms mentioned in the description of the present invention have been selected by the applicant at his or her discretion, the detailed meanings of which are described in relevant parts of the description herein. Therefore, the present invention must be understood, not simply by the actual terms used but by the meanings of each term lying within.

Figure 1:
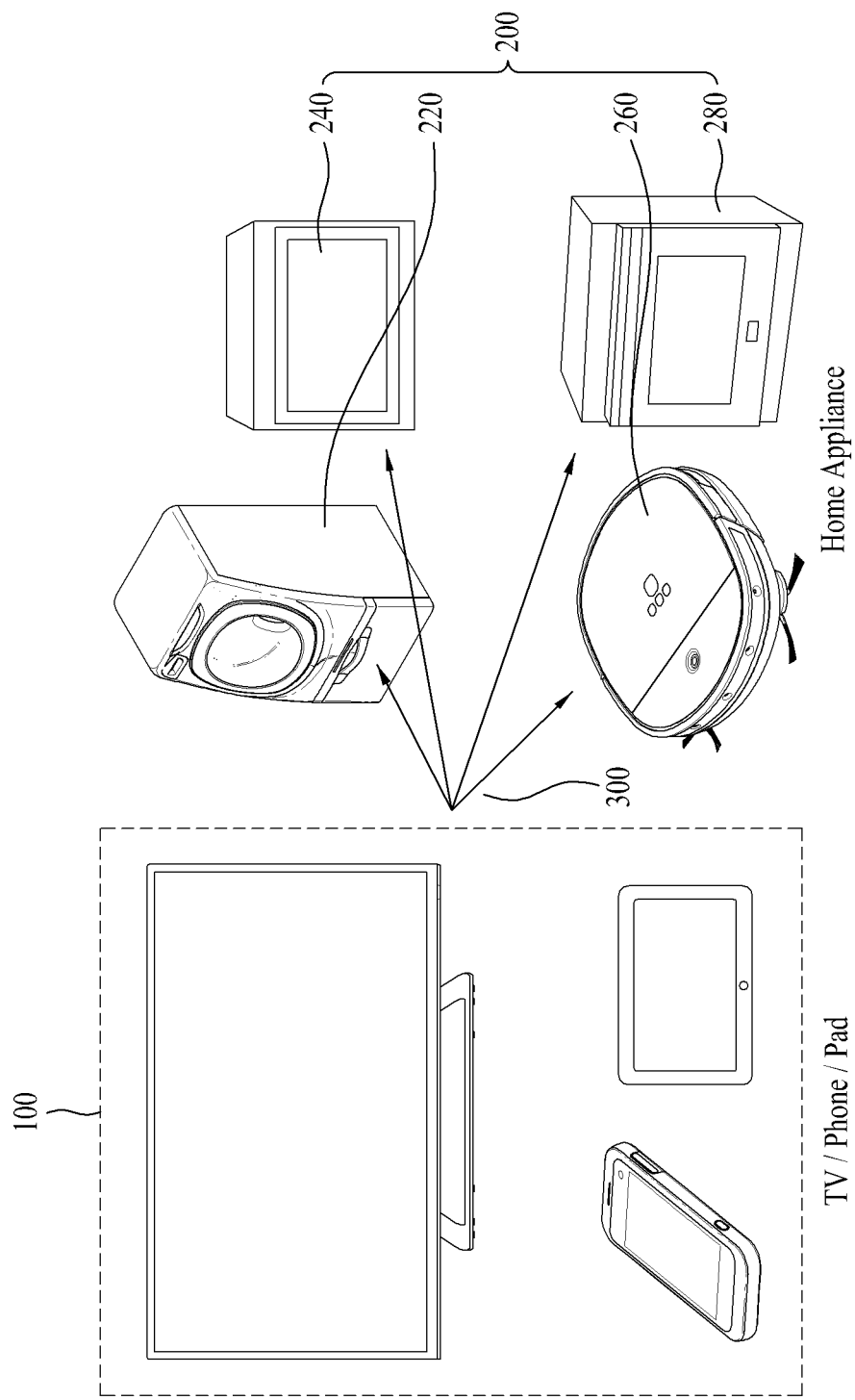
FIG. 1 illustrates a home network system according to an embodiment of the present invention.

FIG. 1 illustrates a home network system according to an embodiment of the present invention. As shown in FIG. 1, the home network system may include various home devices 200, a control device 100 for controlling the home devices 200, and a network 300 for connecting the control device 100 with the home devices 200 in a wired and/or wireless manner.

The home devices according to an embodiment of the present invention may include various electronic devices capable of transmitting/receiving data to/from the control device 100 via the network 300, for example, a washing machine 220, a microwave range 240, a robot vacuum cleaner 260, and an electric oven 280, as shown in FIG. 1 or other devices such as a dish washer, an ice maker, an air conditioner, etc. The home devices 200 can exchange data with the control device 100 through the network 300 or receive uni-directional control commands from the control device 100.

The network 300 may include a variety of wired and/or wireless networks which allow the control device 100 to communicate with the home devices 200. Wireless network schemes that can be used for the network 300 include near field communication (NFC), ZigBee, infrared communication, Bluetooth, WiFi, etc. However, the present invention is not limited thereto.

The control device 100 according to an embodiment of the present invention may use various electronic devices including a display and a communication unit. For example, the control device 100 includes various electronic devices capable of displaying images and performing data communication, such as a television receiver, a cellular phone, a personal digital assistant (PDA), a notebook computer, a tablet PC, an MP3 player, a CD player, and a DVD player. Furthermore, the control device 100 can include devices such as a set-top box and a router, which can be connected to an additional display device through a network or a cable to control image display of the display device. According to an embodiment of the invention, the control device 100 can be a portable device or a specific home device connected to the network 300 can be used as the control device.

Figure 2:
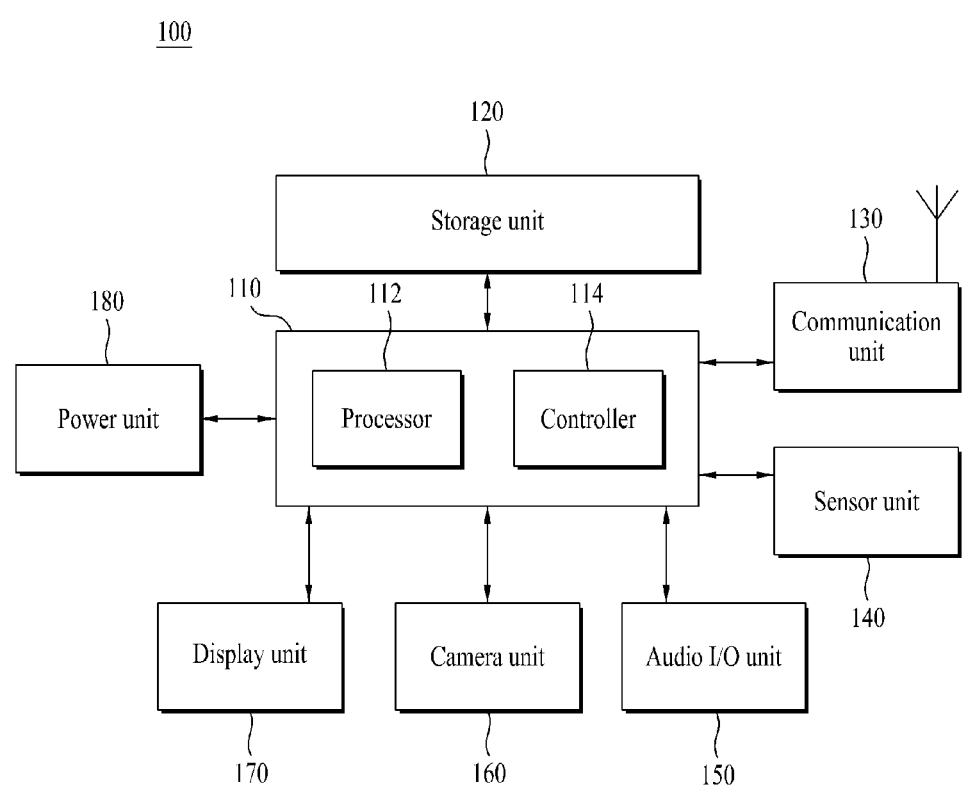
FIG. 2 is a block diagram of a control device according to an embodiment of the present invention.

FIG. 2 is a block diagram of the control device 100 according to an embodiment of the present invention.

Referring to FIG. 2, the control device 100 includes a processor 112, a controller 114, a storage unit 120, a communication unit 130, a sensor unit 140, an audio input/output unit 150, a camera unit 160, a display unit 170, and a power unit 180.

The storage unit 120 can store digital data such as video, audio, pictures, moving images, applications, etc. The storage unit 120 may be a digital data storage space such as a flash memory, a hard disc drive (HDD), solid state drive (SSD) or the like.

The communication unit 130 can transmit/receive data by communicating with home devices using various protocols. The communication unit 130 can transmit/receive digital data by being connected to the network in a wired or wireless manner.

The sensor unit 140 can deliver a user input or information on an environment recognized by the control device 100 to the controller 114 using a plurality of sensors set in the control device 100. Here, the sensor unit 140 can include a plurality of sensing means. In an embodiment, the plurality of sensing means may include a gravity sensor, a terrestrial magnetism sensor, a motion sensor, a gyro sensor, an acceleration sensor, an inclination sensor, a brightness sensor, an altitude sensor, an odor sensor, a temperature sensor, a depth sensor, a pressure sensor, a bending sensor, an audio sensor, a video sensor, a global positioning system (GPS) sensor, a touch sensor, etc. The sensor unit 140 refers to these various sensing means and can sense various user inputs and user environments and transmit a sensing result to the control device 100 such that the control device 100 can perform an operation based on the sensing result. The aforementioned sensors may be included as separate elements in the control device 100, or integrated into one or more elements and included in the control device 100. Alternatively, the sensor unit 140 can be optionally included in the control device according to an embodiment of the present invention.

The audio input/output unit 150 includes an audio output means such as a speaker and an audio input means such as a microphone and may be optionally included in the control device 100 according to an embodiment of the present invention. The audio input/output unit 150 can perform audio output from the control device 100 and audio input to the control device 100 and can be used as an audio sensor.

The camera unit 160 can take a picture or moving image and be optionally included in the control device 100 according to an embodiment of the invention. The camera unit 160 may be used as the aforementioned motion sensor or a visual sensor.

The display unit 170 displays an image on a display screen. The display unit 170 can output an image on the basis of an application executed in the processor 112 or a control command of the processor 112. If the display unit 170 is a touch sensitive display according to an embodiment of the invention, the display unit 170 can be used as the above-mentioned touch sensor. The control device 100 according to another embodiment of the present invention may include a display control unit (not shown) which can control a separate display unit connected to the control device 100 to display an image.

The power unit 180 is a power source connected to an internal battery of the control device 100 or an external power supply and can provide power to the control device 100.

The processor 112 can execute various applications stored in the storage unit 120 and process data in the control device 100. Furthermore, the processor 112 can control data transmission/reception between the above-mentioned units by controlling the units.

The processor 112 and the controller 114 may be integrated into one chip and perform the aforementioned operations together. The processor defined in the present invention includes a processor 110 configured in the form of a chip including the processor 112 and the controller 114 as described above.

FIG. 2 is a block diagram of the control device 100 according to an exemplary embodiment of the invention and separately shown blocks represent logically divided elements. Accordingly, the elements of the control device 100 can be integrated into one chip or mounted in a plurality of chips according to the design of the control device 100.

Figure 3:
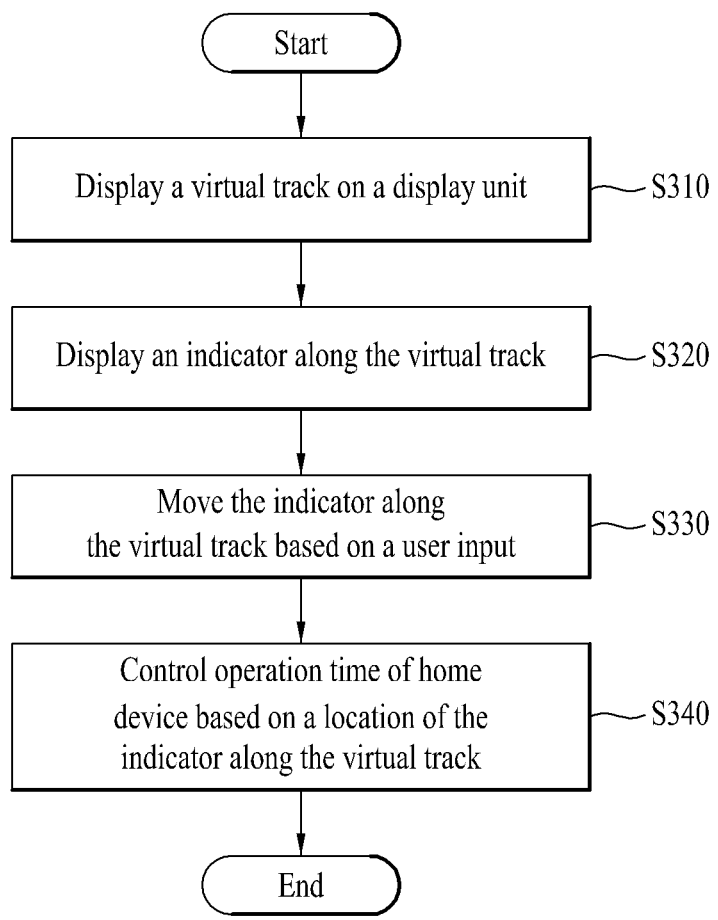
FIG. 3 is a flowchart illustrating a method for controlling home devices according to an embodiment of the present invention.

FIG. 3 is a flowchart illustrating a method for controlling home devices connected to a network according to an embodiment of the present invention.

According to an embodiment of the invention, a control device (e.g., the control device 100) can display a virtual track on a display unit such as a display unit of the control device (S310). The virtual track forms a timeline including at least one of a start time and an end time of an operation being executed by the control device. The virtual track can display relative time information and may further include real-time information.

According to an embodiment of the invention, the control device can display an indicator that indicates operation information of a home device connected to (or communicating with) the control device through a network along the virtual track (S320). The operation information includes at least one of an operation start time and an operation end time of the home device. The indicator can include an icon for indicating the operation start time or operation end time of the home device. In addition, the indicator may further include a virtual slide bar having a length corresponding to a total time between the operation start time and the operation end time of the home device.

According to an embodiment of the present invention, the control device can move the indicator along the virtual track according to a user input (S330). The indicator can be moved along the virtual track on the basis of a user input according to various methods. For example, when the indicator includes the icon for indicating the operation start time or operation end time of the home device, the control device can move the indicator on the basis of a user input applied to the indicator. If the indicator includes the virtual slide bar, the control device can move the indicator on the basis of a user input applied to a first end, a second end or the body part of the virtual slide bar. Embodiments of moving the indicator will be described in detail later.

When the indicator has been moved according to user input, the control device controls an operation time of the home device on the basis of the location of the indicator on the virtual track (S340). The operation time may include at least one of the operation start time and operation end time of the home device. In addition, the control device can control an operation mode of the home device according to a user input applied to the indicator or a user input applied to an additional interface such as a menu button interface. Furthermore, the control device can call a new home device that wants to control an operation thereof. According to an embodiment of the invention, while the control device can transmit a control command to the home device on the basis of the location of the indicator on the virtual track, the control device may transmit only information on the location of the indicator on the virtual track to the home device. In this case, the home device can control an operation thereof on the basis of the location of the indicator on the virtual track.

An operation of the home device according to an embodiment of the present invention can be controlled by a control command of the control device. Specifically, operation information about the operation start time, operation end time and operation mode of the home device can be received from the control device and a detailed operation of the home device can be adjusted on the basis of the operation information. According to another embodiment of the present invention, the home device can receive only information on the location of the indicator on the virtual track, which is displayed by the control device, and control the operation thereof on the basis of the location of the indicator. In this case, the home device can control the operation time thereof, or add or delete some operations thereof on the basis of the location of the indicator. Furthermore, when operation control based on the location of the indicator is unavailable, the home device does not perform operation control and can transmit an error or warning message regarding the unavailability of operation control to the control device.

Figure 4:
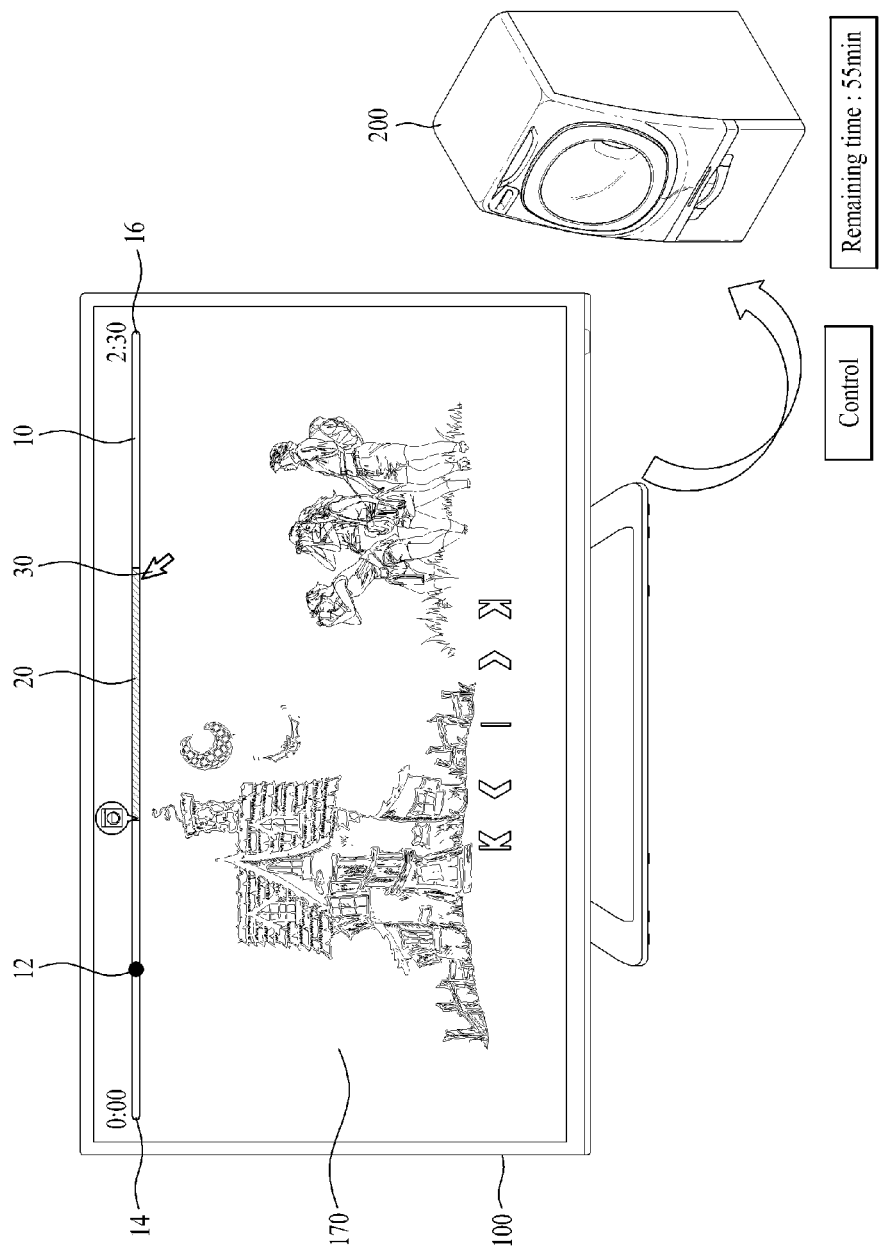
FIG. 4 illustrates a timeline user interface (UI) displayed on a control device according to an embodiment of the present invention.

FIG. 4 shows a timeline user interface (UI) displayed on the display unit 170 of the control device 100 according to an embodiment of the present invention. The timeline UI according to an embodiment of the present invention is used to control operation of a home device through the control device 100 and includes the virtual track 10 and the indicator 20.

The virtual track 10 indicates time information on an operation being executed by the control device 100 in the form of a timeline. More specifically, the virtual track 10 corresponds to a timeline including at least one of the start time 14 and end time 16 of an operation being executed by the control device 100. The timeline may be extended from the start time 14 or end time 16 of the virtual track 10. The virtual track 10 can display a progress bar or progress indicator 20 which indicates a progress degree of an operation being executed by the control device. According to an embodiment of the present invention, relative time information respectively corresponding to the start time 14 and end time 16 of the operation being executed by the control device may be indicated as text at positions corresponding to the start time 14 and end time 16, and relative time information of the positions may be additionally indicated at an arbitrary position. In addition, real-time information can also be indicated at the corresponding positions on the virtual track 10. Here, the relative time information represents relative time of the corresponding position when the start time 14 of the virtual track 10 is set to 0 and the real-time information represents local time at the corresponding position on the virtual track 10.

The indicator 20 that indicates operation information of a home device 200 connected to the control device 100 through a network can be displayed on the virtual track 10. The operation information can include at least one of an operation start time and operation end time of the home device 200 and may further include operation mode information of the home device 200. The operation information of the home device 200 can be received through the network and may be set according to a user input applied to the control device 100. That is, operation information of a home device which is connected through the network and is being operated can be displayed through the indicator 20, and operation information of a home device operated or reserved according to a user input applied through the control device can be indicated through the indicator 20. The indicator 20 can be displayed on the virtual track 10 on the basis of the operation information. More specifically, the indicator 20 can be displayed at a position corresponding to operation time information from among the operation information on the virtual track 10.

In an embodiment of the present invention, a user can operate the indicator 20 displayed on the virtual track 10 to control an operation of the home device 200 indicated by the indicator 20.

For example, when the user views video through a TV receiver, as shown in FIG. 4, the user may want to control the home device 200, for example, a washing machine, such that the washing machine operates while the video is played. If the running time of the video being viewed by the user is two and a half hours and a driving time of the washing machine 200 connected through a network is 55 minutes, the user may want to set the washing operation end time of the washing machine to the end time of the video. To achieve this, the user can use the TV receiver as the control device 100 and control the operation of the home device 200 connected to the control device 100 via the network.

Specifically, the control device 100 displays the indicator 20 that indicates operation information of the home device 200 connected thereto via the network on the virtual track 10. The indicator 20 can be moved on the virtual track on the basis of a user input. The user input can be applied through an additional pointer 30 on the display unit 170. The pointer 30 can be operated through an input unit of the control device 100 or an additional input unit connected to the control device 100. If the display unit 170 is a touch sensitive display, the user input can be applied through a touch of the display unit 170.

The processor of the control device 100 moves the indicator 20 displayed on the display unit 170 on the virtual track 10 on the basis of the user input. Upon change of the location of the indicator 20, the operation time of the home device 200 indicated by the indicator 20 is adjusted. The processor of the control device 100 controls the operation time of the home device 200 on the basis of the location of the indicator on the virtual track 10. The controlled operation time may include at least one of the operation start time and operation end time of the home device 200. An embodiment of control of the operation time of the home device 200 based on the location of the indicator 20 will be described in detail later.

FIGS. 5 to 11 illustrate the timeline UI indicator and a method for operating the same according to embodiments of the present invention.

Figure 5:
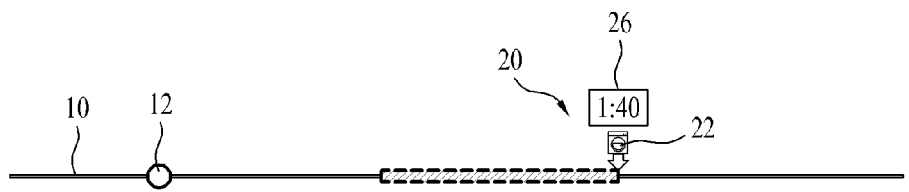
FIGS. 5 to 11 illustrate an indicator of a timeline UI and a method for operating the indicator according to an embodiment of the present invention.
Figure 5:
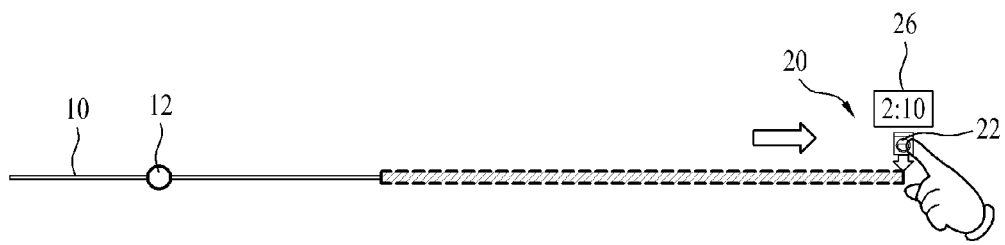
Figure 5:

Referring to FIG. 5, the indicator 20 can indicate an operation end time of a home device. As shown in FIG. 5(a), the indicator 20 can include an icon 22 located at a point corresponding to the end time in the total operation time (indicated by a dotted line) of the home device. The control device can control the operation time of the home device on the basis of a user input for moving the icon 22. For example, the control device can move the icon 22 on the virtual track 10 on the basis of the user input, as shown in FIG. 5(b), and adjust the operation end time of the home device on the basis of the location of the icon 22 on the virtual track 10. Alternatively, when the total operation time of the home device is set to a constant time, the operation start time and operation end time of the home device can be adjusted together on the basis of the location of the icon 22, as shown in FIG. 5(c). The indicator 20 may further include a time window 26 that indicates time information. The time window 26 can indicate at least one of i) time ranging from the operation end time of the corresponding home device to the progress indicator 12, ii) relative time at which the operation of the home device is ended, and iii) real time at which the operation of the home device is finished, according to a predetermined mode.

According to the embodiment of the present invention shown in FIG. 5, the user can intuitively control an operation end time of a home device by comparing the operation end time of the home device with an end time of an operation currently being executed by the control device. That is, since the indicator 20 according to the embodiment illustrated in FIG. 5 indicates the operation end time of the home device, the user can conveniently make the operation end time of the home device correspond to the end time of the operation currently being executed by the control device by operating the indicator 20.

Figure 6:
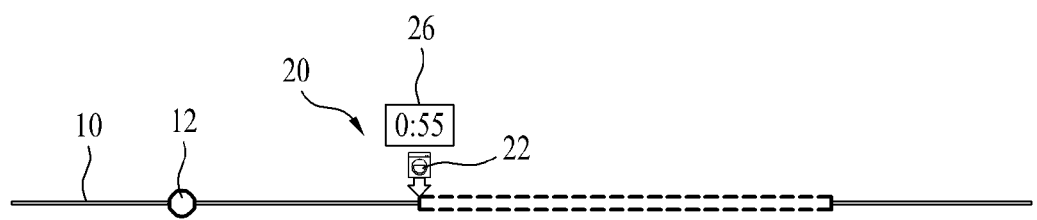
Figure 6:
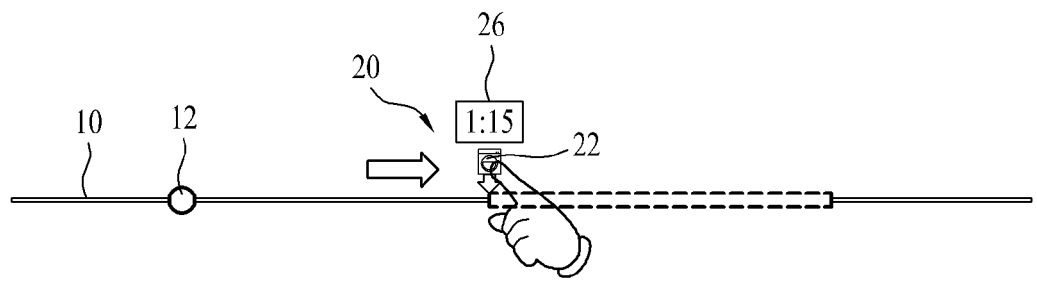
Figure 6:
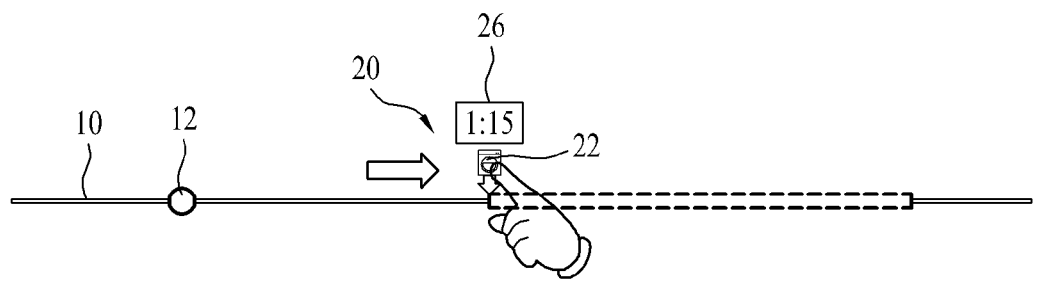

According to another embodiment of the present invention, the indicator 20 can indicate an operation start time of a home device, as shown in FIG. 6. Referring to FIG. 6(a), the indicator 20 can include the icon 22 located at a point corresponding to the start time in the total operation time (indicated by a dotted line) of the home device. The control device can control the operation time of the home device on the basis of a user input for moving the icon 22. For example, the control device can move the icon 22 on the virtual track 10 on the basis of the user input, as shown in FIG. 6(b), and adjust the operation start time of the home device on the basis of the location of the icon 22 on the virtual track 10. Alternatively, when the total operation time of the home device is set to a constant time, the operation start time and operation end time of the home device can be adjusted together on the basis of the location of the icon 22, as shown in FIG. 6(c). The indicator 20 may further include a time window 26 that indicates time information. The time window 26 can indicate at least one of i) time ranging from the operation end or start time of the corresponding home device to the progress indicator 12, ii) relative time at which the operation of the home device is started, and iii) real time at which the operation of the home device is started, according to a predetermined mode.

In the embodiments of the present invention shown in FIGS. 5 and 6, the indicator 20 can be prevented from entering a section in which movement of the indicator 20 is unavailable. Alternatively, when the indicator 20 enters the unavailable section according to a user input, warning about the entry of the indicator 20 may be indicated. For example, if the indicator 20 is moved according to a user input such that the point corresponding to the operation start time of the corresponding home device on the virtual track 10 is ahead of the location of the progress indicator 12, the location of the indicator 20 may correspond to the unavailable section. To prevent this, it is possible to restrain the indicator 20 from entering the section in which the operation start time of the home device is ahead of the progress indicator 12 on the virtual track 12, or to indicate warning when the indicator 20 enters the corresponding section.

Figure 7:
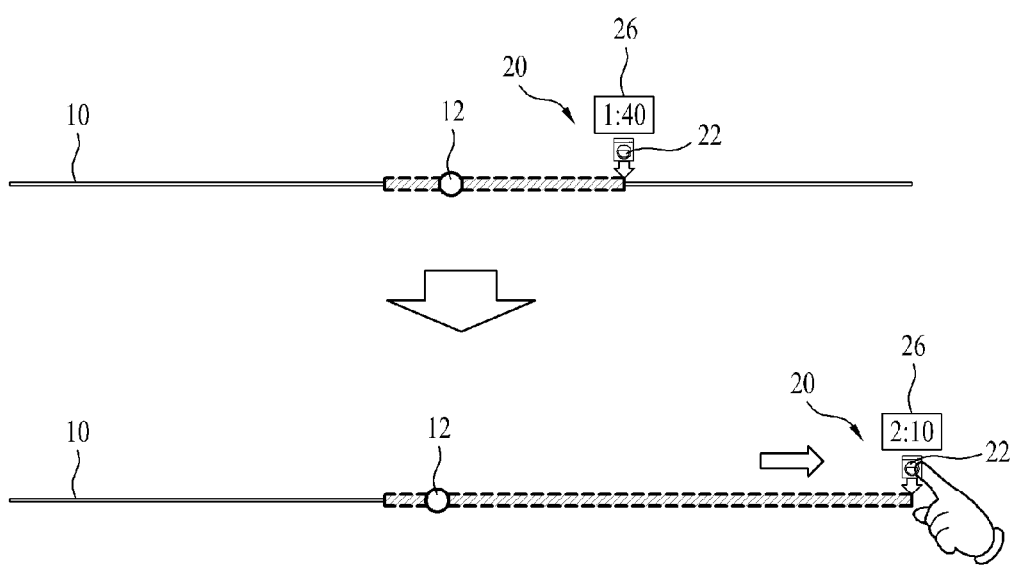

In accordance with another embodiment of the present invention, when the indicator 20 that indicates a home device whose total operation time is set to a constant time is moved while the home device is operating, the control device can adjust the total operation time of the home device on the basis of the location of the indicator 20. FIG. 7 illustrates an example of adjustment of the total operation time of the home device according to movement of the indicator 20 when the indicator 20 indicates the operation end time of the home device as in the above-described embodiment of FIG. 5.

Referring to FIG. 7, a user input for moving the indicator 20 may be applied while the home device having a constant operation time is operating. At this time, the progress indicator 12 may be located within a section corresponding to the total operation time of the home device. In this case, it may be impossible to adjust the operation start time of the home device according to the user input applied to the indicator 20 while maintaining the total operation time of the home device constant. Accordingly, the control device according to embodiments of the present invention can control only the operation end time of the home device to correspond to the location of the indicator 20 without changing the operation start time of the home device so as to adjust the total operation time of the home device. If the total operation time of the home device increases, the control device can add some executable operations of the home device or pause the operation of the home device. If the total operation time of the home device decreases, the control device can delete some operations of the home device such that the operation of the home device corresponds to the decreased time. According to another embodiment of the present invention, the control device can transmit only information about the location of the indicator 20 on the virtual track 10 such that the corresponding home device can directly add some operations, interrupt an operation for a moment, or delete some operations on the basis of the location of the indicator 20.

Figure 8:
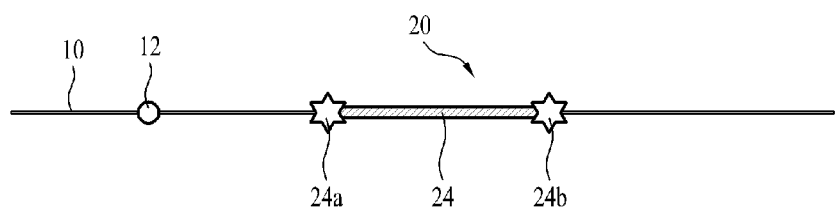
Figure 8:
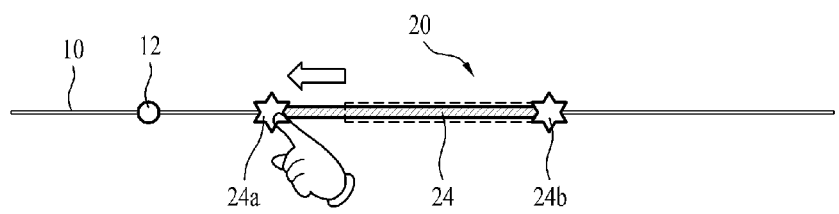
Figure 8:
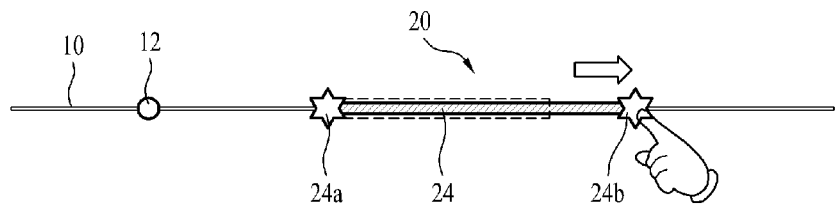

In other embodiments of the present invention, the indicator 20 can indicate the total operation time including the operation start time and operation end time of the home device, as shown in FIGS. 8 to 11. As shown in FIG. 8(*a*), the indicator 20 can include a virtual slide bar 24 having a length corresponding to the total time between the operation start time and the operation end time of the home device. The virtual slide bar 24 can include a first end 24*a* and a second end 24*b* respectively corresponding to the operation start time and operation end time of the home device. The first end 24*a* and the second end 24*b* can be respectively located at points respectively corresponding to the operation start time and operation end time of the home device on the virtual track 10. The control device can control the operation time of the home device on the basis of a user input for operating the virtual slide bar 24. For example, the control device can adjust the operation start time of the home device on the basis of a point to which the first end 24*a* has been moved, as shown in FIG. 8(*b*) and/or independently adjust the operation end time of the home device on the basis of a point to which the second end 24*b* has been moved, as shown in FIG. 8(*c*).

Figure 9:
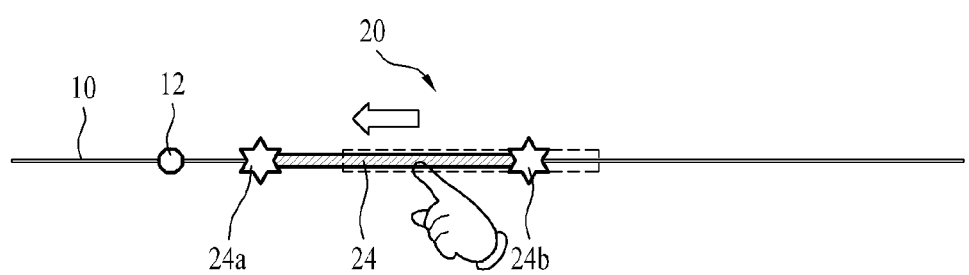
Figure 9:
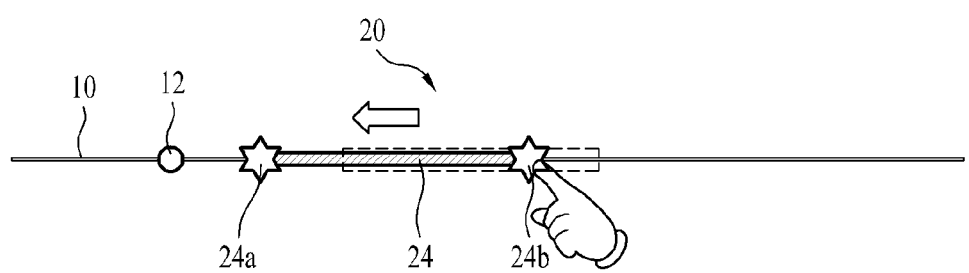

When a user input for moving the body part of the virtual slide bar 24 is applied to the virtual slide bar 24, as shown in FIG. 9(*a*), the first end 24*a* and the second end 24*b* are moved together with the body part of the virtual slide bar 24, and thus the operation start time and operation end time of the home device can be adjusted together. When the total operation time of the home device is set to a constant, the whole virtual slide bar 24 can be moved even with a user input for moving one of the first end 24*a* and the second end 24*b*, and thus the operation start time and operation end time of the home device can be adjusted together, as shown in FIG. 9(*b*).

Figure 10:
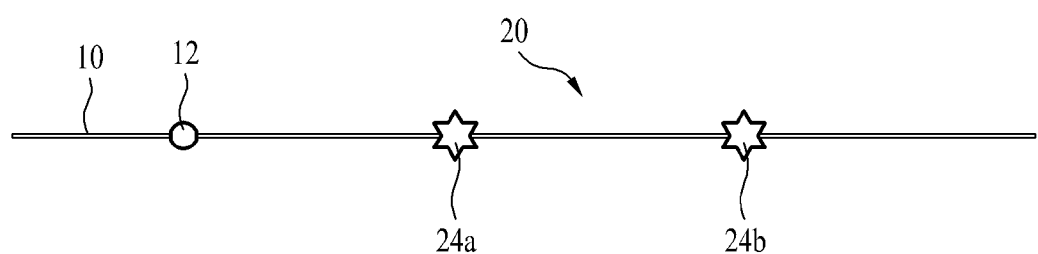
Figure 10:
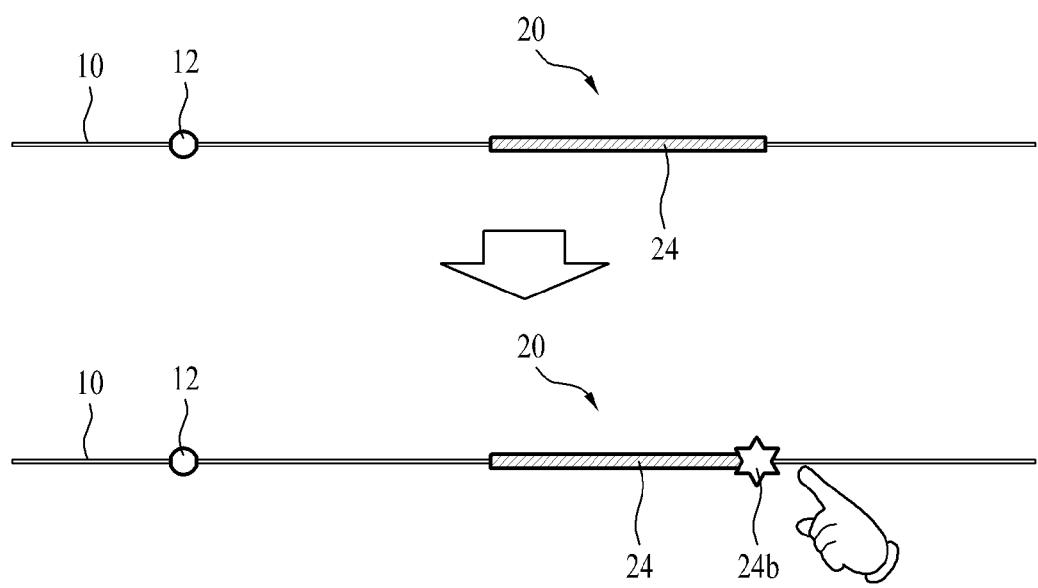

While the virtual slide bar 24 can include all the first end 24*a*, the second end 24*b* and the body part in the present embodiment of the invention, only the first end 24*a* and second end 24*b* can be displayed, as shown in FIG. 10(*a*). Alternatively, the virtual slide bar 24 can be displayed in such a manner that only the body part thereof is basically displayed and the first end 24*a* or the second end 24*b* is displayed only when a pointer or touch input by a user approaches within a predetermined distance of the first end 24*a* or second end 24*b* of the virtual slide bar 24, as shown in FIG. 10(*b*).

Figure 11:
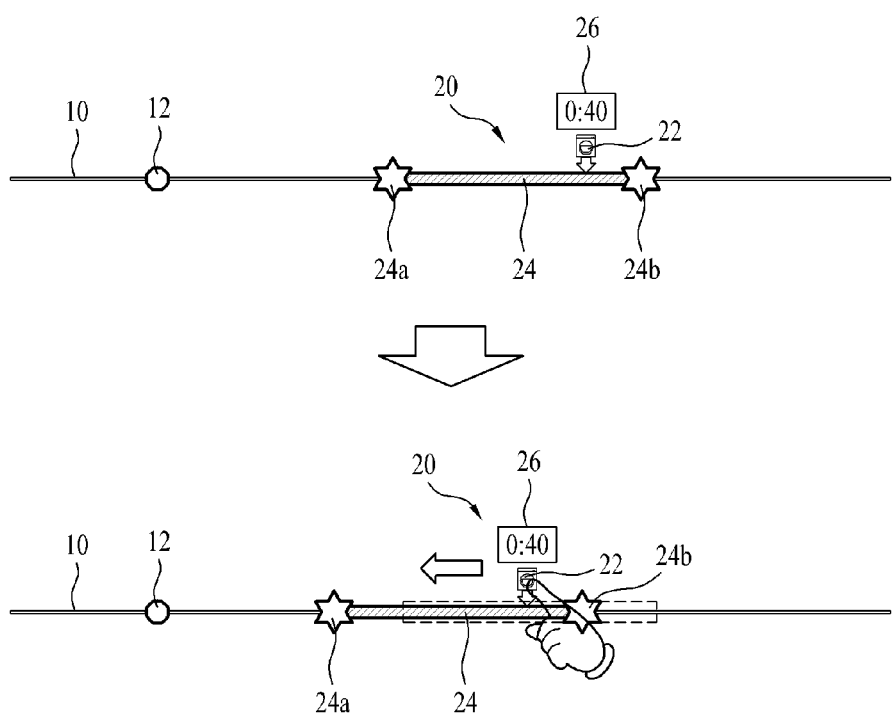

According to an embodiment of the present invention, the indicator 20 may further include the icon 22 even when the indicator 20 includes the virtual slide bar 24, as shown in FIG. 11. In this case, the icon 22 can indicate operation information of the home device along with the virtual slide bar 24. Particularly, the icon 22 can indicate operation mode information of the home device as described below. When the indicator 20 includes both the icon 22 and the virtual slide bar 24, the virtual slide bar 24 can be moved along with the icon 22 according to an input for moving the icon 22, and thus the operation start time and operation end time of the home device can be adjusted together.

Referring to FIG. 11, the indicator 20 may further include the time window 26 for indicating time information as described above. The time window 26 can indicate at least one of i) time ranging from the operation start time of the corresponding home device to the progress indicator 12, ii) relative time at which the operation of the home device is started, iii) real time at which the operation of the home device is started, iv) time ranging from the operation end time of the corresponding home device to the progress indicator 12, v) relative time at which the operation of the home device is ended, vi) real time at which the operation of the home device is finished, and vii) total operation time of the home device, according to a predetermined mode.

In the embodiments of the present invention illustrated in FIGS. 8 to 11, the first end 24*a* or the second end 24*b* of the virtual slide bar 24 can be prevented from entering a section in which movement of at least one of the first end 24*a* and the second end 24*b* of the virtual slide bar 24 is unavailable. Alternatively, when at least one of the first end 24*a* and the second end 24*b* of the virtual slide bar 24 enters the unavailable section according to user input, warning about the entry can be indicated. For example, when the position of the first end 24*a* of the virtual slide bar 24 is ahead of the progress indicator 12 according to an operation of the indicator 20 based on a user input, the position of the first end 24*a* may correspond to the unavailable section. Furthermore, when the location of the second end 24*b* of the virtual slide bar 24 is ahead of the location of the first end 24*a* according to a user input applied to the first end 24*a* or the second end 24*b* of the virtual slide bar 24, the location of the first end 24*a* or the second end 24*b* may correspond to the unavailable section. To prevent this, it is possible to restrain the first end 24*a* or the second end 24*b* of the virtual slide bar 24 from entering the unavailable section or, when at least one of the first end 24*a* and the second end 24*b* of the virtual slide bar 24 enters he unavailable section, indicate a warning sign.

In embodiments of the present invention, the indicator can be operated by a user touch input (for example, touch & drag) applied to the display unit of the control device. The touch input may include single touch, double touch, long touch, drag, and various combinations thereof. Furthermore, the indicator can be operated by the input unit of the control device or a pointer operation using an input unit connected to the control device, as described above. Here, the pointer operation corresponds to the touch input and can include single click, double click, long click, drag, and various combinations thereof. In the following description, a user input through a touch input can be replaced by a user input according to a pointer operation. In addition, the indicator can be operated according to a user gesture and a user voice input, and the present invention is not limited thereto.

The operation information of the home device 200, indicated by the indicator 20, may include operation mode information as well as the operation time information. The operation mode information represents a currently performed work from among works that can be performed by the home device 200. For example, operation modes may include 'cooling', 'blowing' and 'dehumidification' when the home device 200 is an air conditioner and include 'washing', 'rinsing' and 'spin dry' when the home device 200 is a washing machine.

Figure 12:
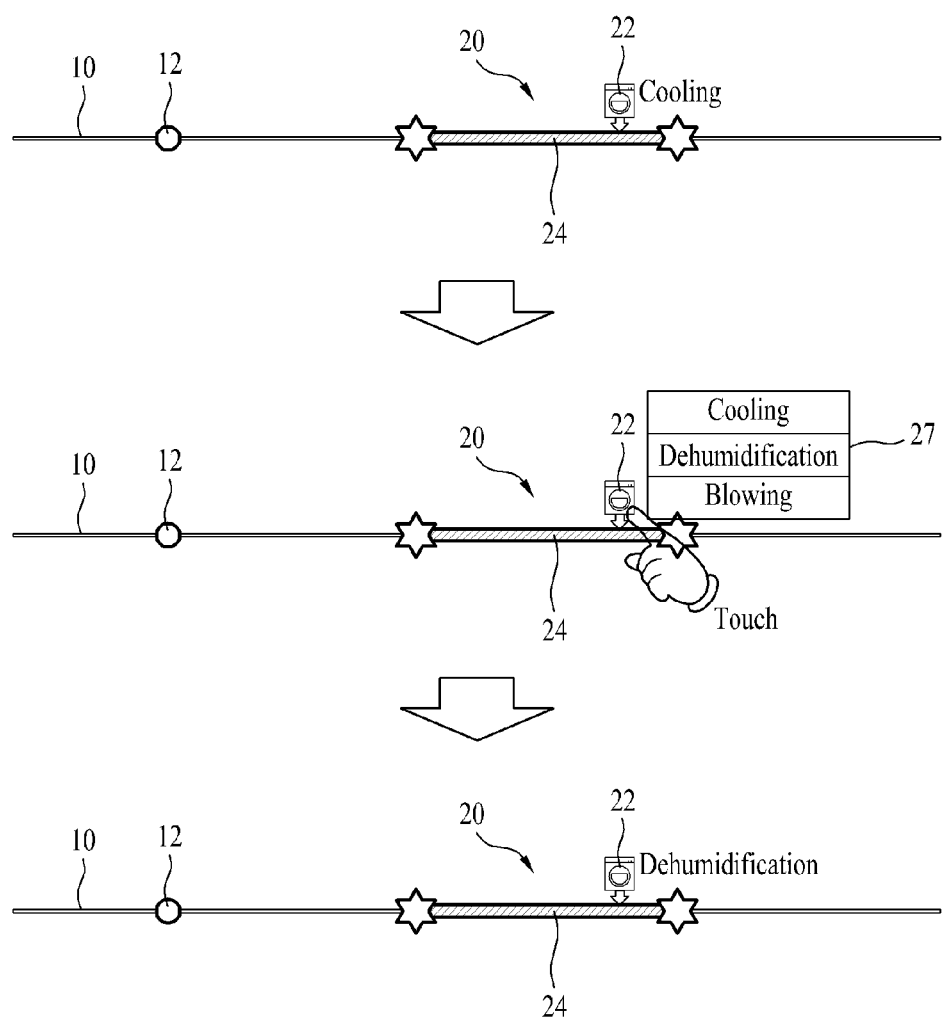
FIGS. 12 to 14 illustrate a method for controlling an operation mode of a home device according to an embodiment of the present invention.
Figure 13:
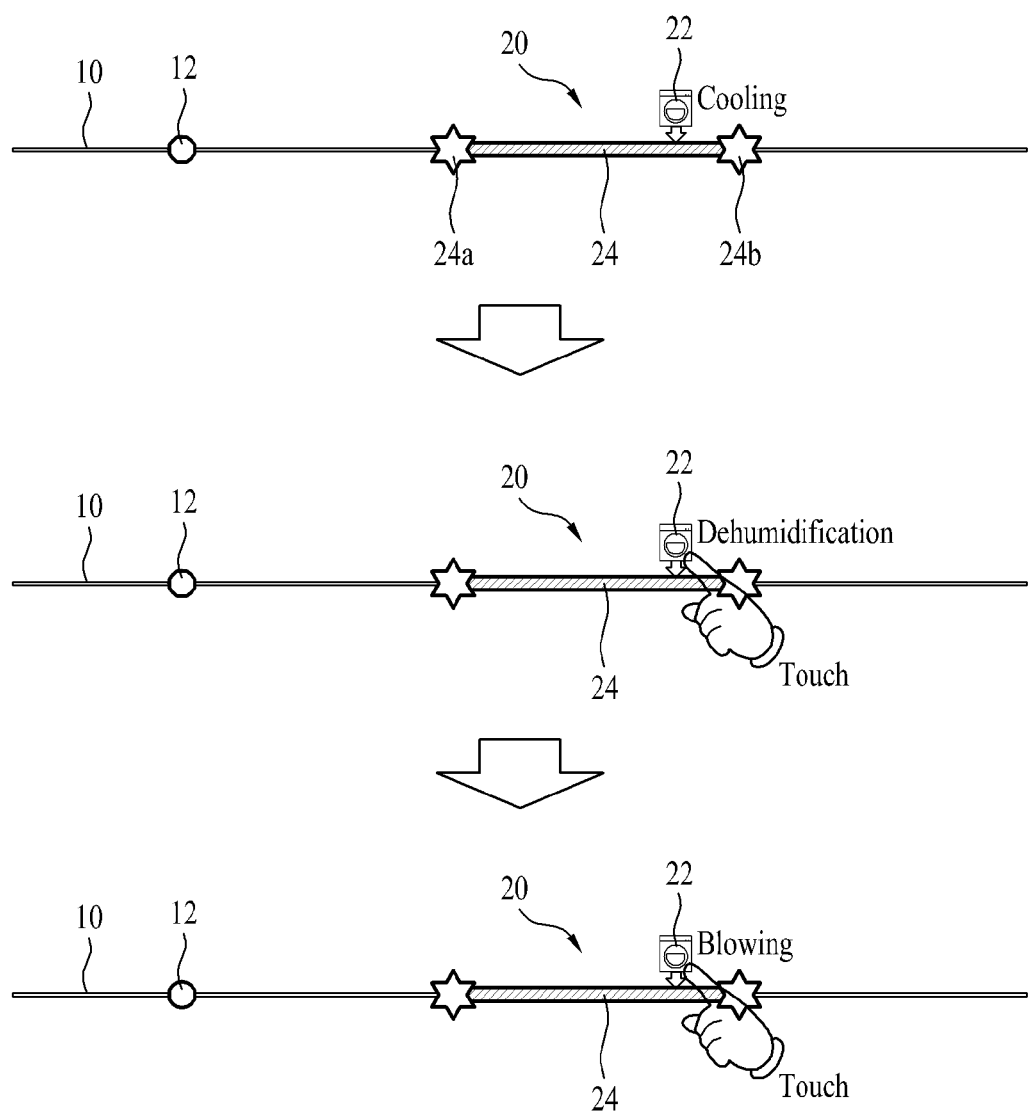

According to embodiments of the present invention, the operation modes of the home device 200 can be controlled on the basis of a user input applied to the indicator 20. For example, as shown in FIG. 12, a mode selection window 27 for selecting an operation mode can be activated on the basis of a user touch input (e.g. single touch, double touch, or long touch) applied to the indicator 20 that indicates an air conditioner whose current operation mode is 'cooling'. When a specific mode, for example, 'blowing' is selected by a user touch input from modes (e.g. cooling, blowing and dehumidification) displayed in the mode selection window 27, the operation mode of the air conditioner is changed to 'blowing'. According to another embodiment of the present invention, as shown in FIG. 13, the operation mode of the air conditioner can be changed whenever a user touch input is applied to the indicator 20. In this case, the additional mode selection window may not be activated for a user touch input applied to the indicator 20.

Figure 14:
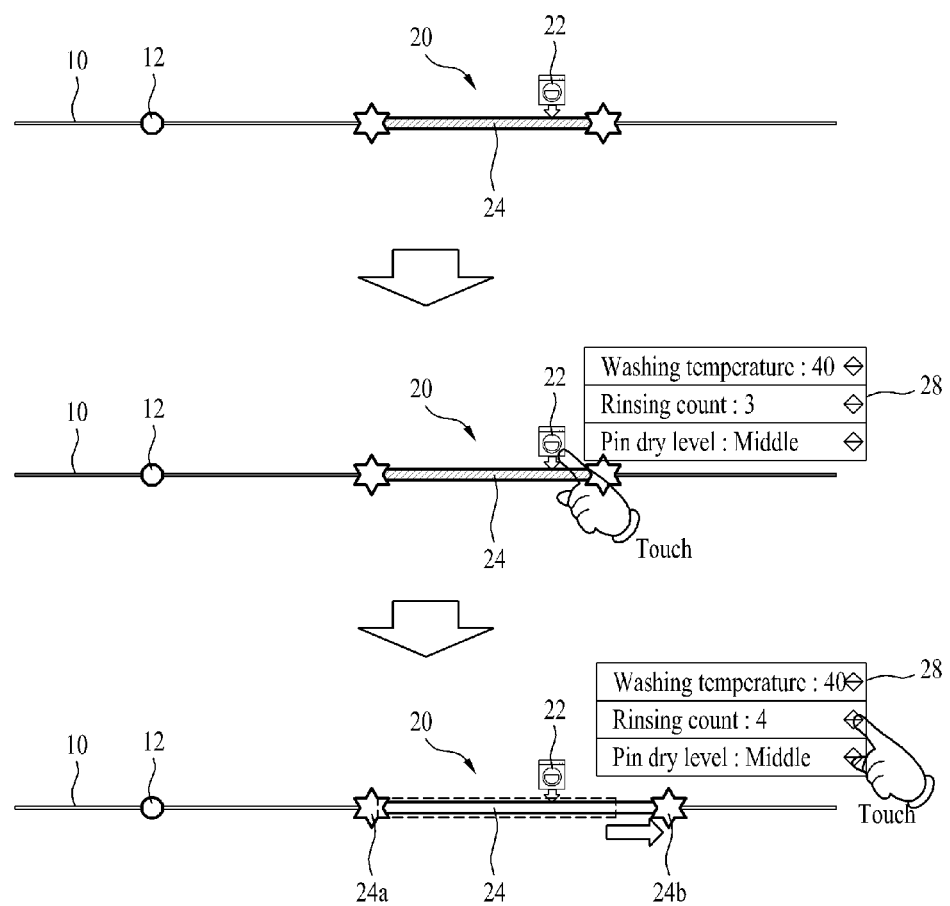

In accordance with another embodiment of the present invention, it is possible to control a detailed operation of the home device 100 on the basis of a user input applied to the indicator 20. For example, as shown in FIG. 14, the indicator 20 that indicates a home device being worked or scheduled to work, for example, a washing machine, can be displayed on the virtual track 10. In this case, upon a user touch input (e.g. single touch, double touch, or long touch) applied to the indicator 20, a control input window 28 for controlling detailed operations of the washing machine indicated by the indicator 20 can be activated. The control input window 28 can display operation setup states (e.g., washing temperature: 40, number of rinsing cycles: 3, spin dry level: intermediate) of an operation of the washing machine, which is currently being performed or scheduled to be performed. When a user input is applied for an operation setup state displayed in the control input window 28, a detailed operation of the home device, which corresponds to the operation setup state, can be adjusted. For example, when a user input for increasing the number of rinsing cycles is applied through the control input window 28, the number of rinsing cycles of the washing machine is increased from 3 to 4.

Figure 15:
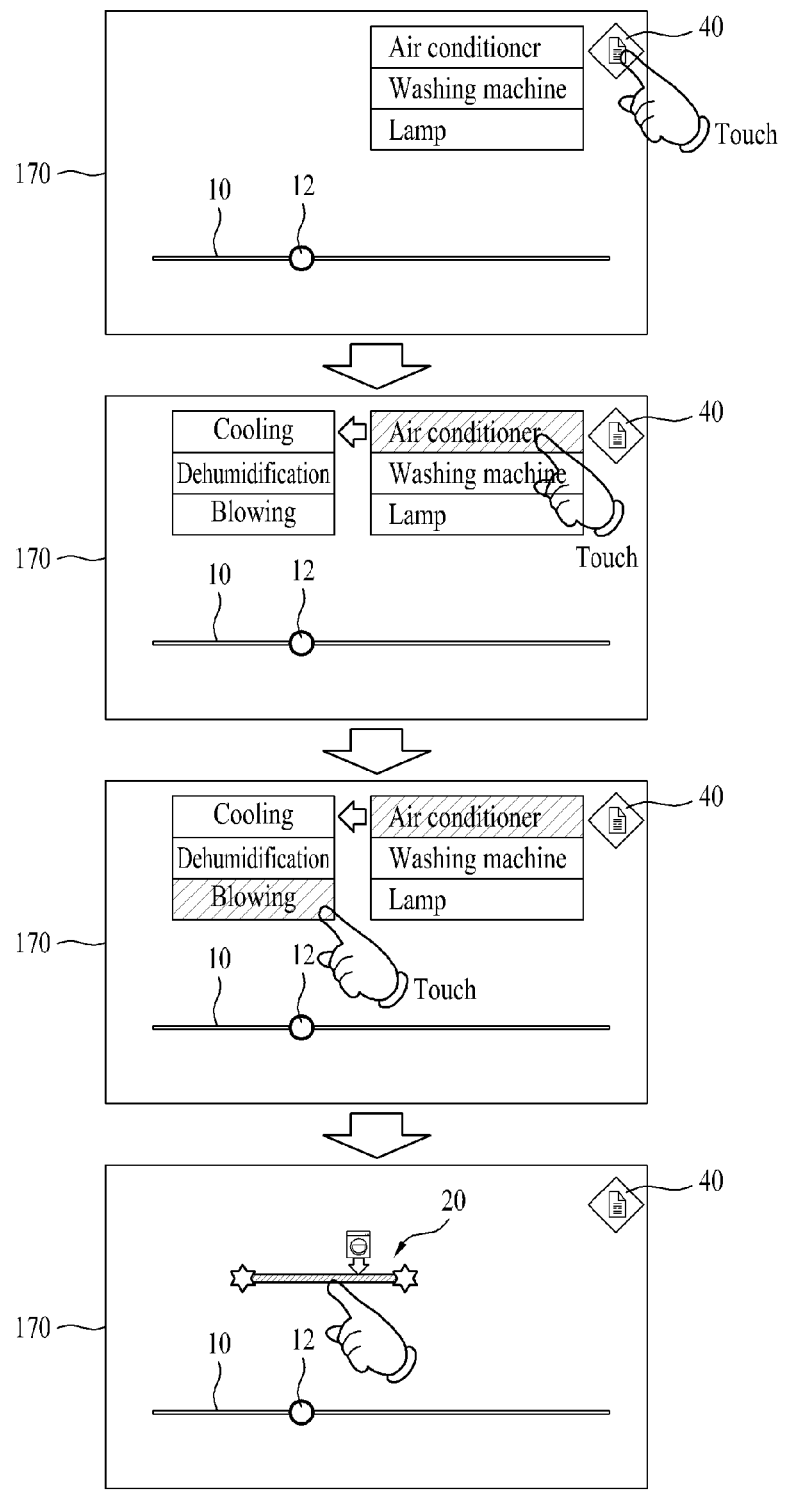
FIG. 15 illustrates menu button interfaces for selecting a specific home device to be controlled and for selecting an operation mode of the selected specific home device according to an embodiment of the present invention.

FIG. 15 illustrates a timeline UI according to another exemplary embodiment of the present invention, which shows a menu button interface 40 for selecting a specific home device to be controlled and an operation mode of the specific home device. The menu button interface 40 can be displayed on the display unit 170 of the control device and the indicator 20 that indicates the specific home device selected through an input applied to the menu button interface 40 can be activated on the display unit 170. For example, when a user touch input is applied to the menu button interface 40, the display unit 170 can display a list of home devices (e.g. an air conditioner, a washing machine, a lamp, etc.) which can be currently controlled by the control device. Upon selection of a specific home device (e.g. air conditioner) according to a user touch input, a list for selecting an operation mode ('cooling', 'dehumidification', or 'blowing') of the home device can be displayed. When a specific operation mode (e.g. 'blowing') is selected from the list for selecting an operation mode of the home device according to a user touch input, the indicator 20 that indicates the operation mode of the home device can be activated.

In this case, the indicator 20 indicates operation information including at least one of an operation start time and operation end time of the home device, and the operation information may include operation mode information of the home device. The indicator 20 may include the icon or virtual slide bar, as described above. The indicator 20 can be activated and displayed on the display unit 170. The indicator 20 can be displayed at a point to which a last user touch input applied or at an arbitrary point on the virtual track 10. The activated indicator 20 can be moved to a specific point on the virtual track 10 according to a user touch input, for example, touch & drag input. The operation start time and operation end time of the home device indicated by the indicator 20 can be controlled on the basis of the location of the indicator 20 on the virtual track 10.

Figure 16:
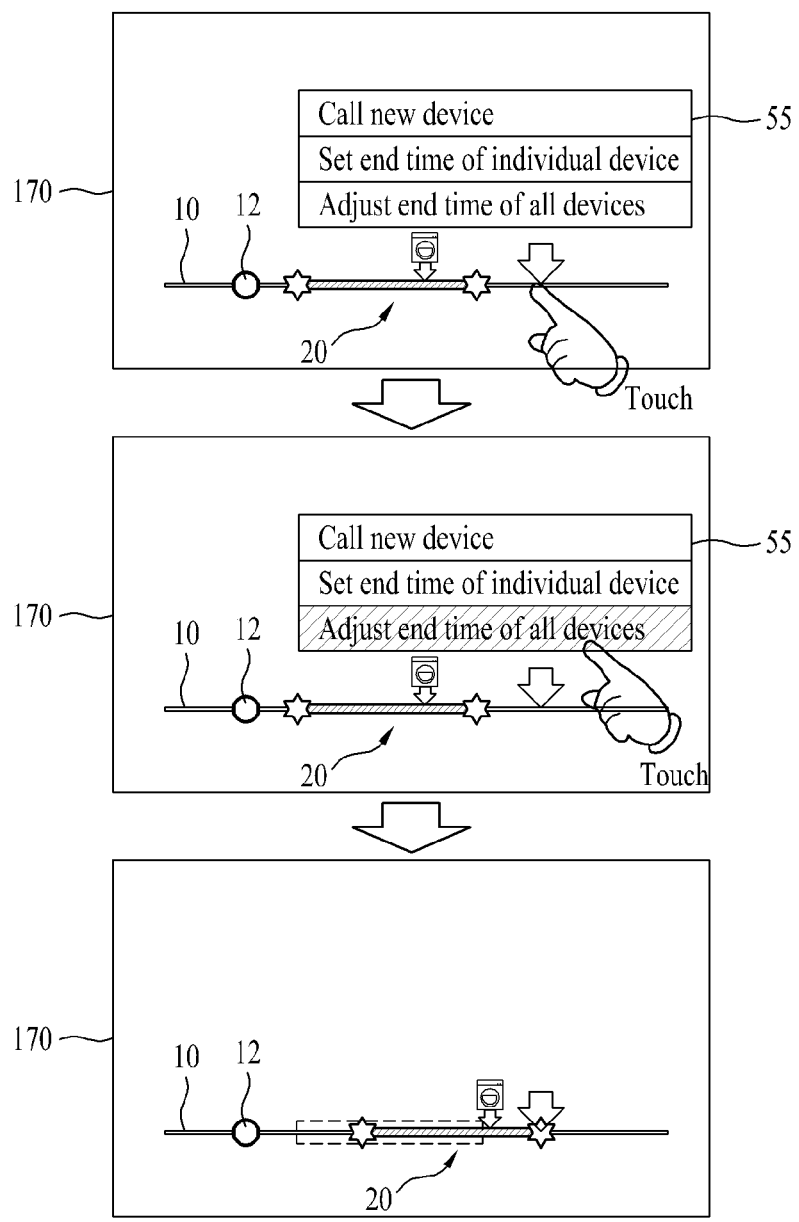
FIG. 16 illustrates a method for controlling a home device according to a user input applied to a specific point on a virtual track according to an embodiment of the present invention.

According to another embodiment of the present invention, illustrated in FIG. 16, a home device control window 55 can be activated in response to a user touch input (e.g. long touch) applied to a specific point on the virtual track 55. According to a touch input applied to the home device control window 55, i) a home device currently controllable by the control device can be called, as does using the menu button interface 40 described with reference to FIG. 15, ii) an operation time (operation start time or operation end time) of a specific home device currently activated on the virtual track 10 can be controlled on the basis of the current touch input point, or iii) operation time of all the home devices currently activated on the virtual track 10 can be controlled on the basis of the current touch input point.

Figure 17:
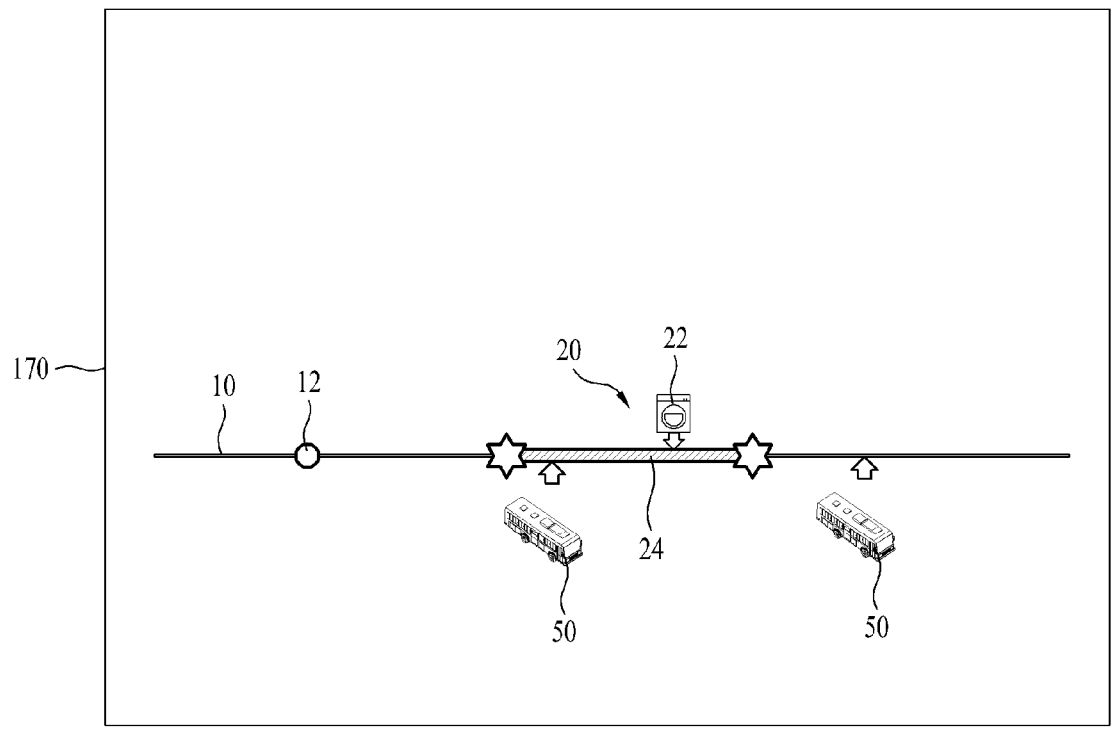
FIG. 17 illustrates a method for displaying additional event information such as traffic information on the timeline UI according to an embodiment of the present invention.

FIG. 17 shows an additional embodiment of the present invention, which relates to a method of displaying additional event information on the display unit 170 of the control device addition to the operation information of the home device. According to this embodiment, information about a time when a specific event occurs or a time when the specific event is expected to occur can be received, and one or more event icons 50 that indicate the time when the specific event occurs or the time when the specific event is expected to occur can be displayed on the virtual track 10. The specific event may include transportation information such as arrival time of a bus or a train. For example, the communication unit 130 of the control device 100, shown in FIG. 2, can receive information on a time when a bus with a specific route number will arrive at a specific bus stop through a network. Information about the specific route number or the specific bus stop can be directly input by a user or selected on the basis of a sensing value obtained using a sensor of the control device. As an example of using a sensor of the control device, information about a bus stop in proximity to the current location of the control device can be indicated using a GPS sensor. Otherwise, information about a bus stop currently recognized by a camera sensor of the control device can be indicated using an augmented reality technique. Alternatively, information on a route number or information on a bus stop can be recognized by scanning a bus table or a train table.

The event icon indicates a time when a selected event is occurred or a time when the selected event is expected to occur and can be displayed at a point on the virtual track 10, which corresponds to the time. The event icon 50 can additionally indicate relative time information or real-time information at the corresponding position on the virtual track 10. When the event icon 50 is displayed on the virtual track 10, the user can intuitively recognize the relationship between the time when the event is occurred (or time when the event is expected to occur) and the operation time of the home device, and thus the user can control the operation time of the home device by operating the indicator 20.

Figure 18:
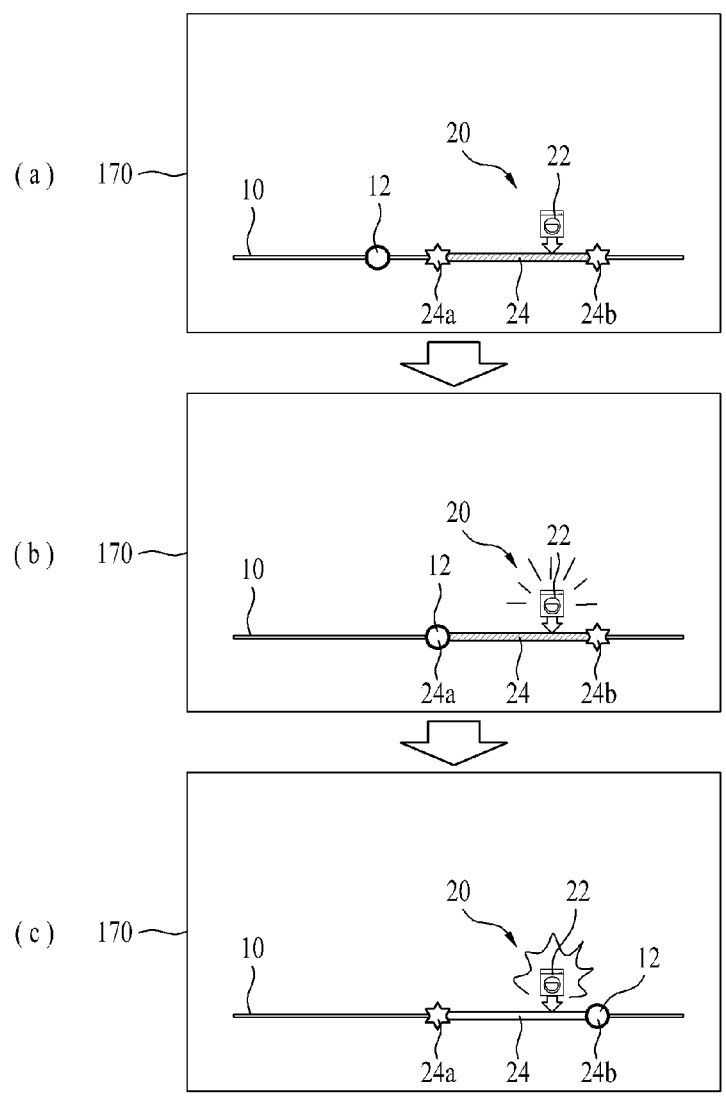
FIG. 18 illustrates an operation of an alarm according to an operation state of a home device according to an embodiment of the present invention.

FIG. 18 illustrates a case in which an alarm is set according to an operation state of a home device according to an embodiment of the present invention. In this embodiment, at one or both of the operation start time and operation end time of the home device indicated by the indicator 20, an alarm for signaling one or both of the operation start time and operation end time of the home device may be generated.

For example, as shown in FIG. 18(*a*), at the operation start time of the home device, the progress indicator 12 on the virtual track 10 can correspond to the first end 24*a* of the virtual slide bar 24 of the indicator 20 which indicates the home device. At this time, an alarm (or alert notice) that signals the operation start time of the home device can be displayed on the display unit 170 as shown in FIG. 18(*b*). To achieve this, the color or shape of the indicator 20 can be changed from a first state to a second state, or effects such as flickering or gradation can be provided to the indicator 20. Alternatively, a message representing that the operation of the home device is started can be displayed on the display unit 170. In addition or in the alternative, an audible sound may be generated as the alarm.

Similarly, as shown in FIG. 18(*c*), at the operation end time of the home device, the progress indicator 12 on the virtual track 10 can correspond to the second end 24*b* of the virtual slide bar 24 of the indicator 20 which indicates the home device. At this time, an alarm that signals the operation end time of the home device can be displayed on the display unit 170. To achieve this, the color or shape of the indicator 20 can be returned to the first state from the second state, or changed from the second state to a third state. Otherwise, effects such as flickering or gradation can be provided to the indicator 20. Alternatively, a message representing that the operation of the home device is ended can be displayed on the display unit 170. In addition or in the alternative, an audible sound may be generated as the alarm.

The alarm according to an embodiment of the present invention can be generated at the time when the specific event is occurred, described in the embodiment of FIG. 17, as well as at the operation time of the home device.

Figure 19:
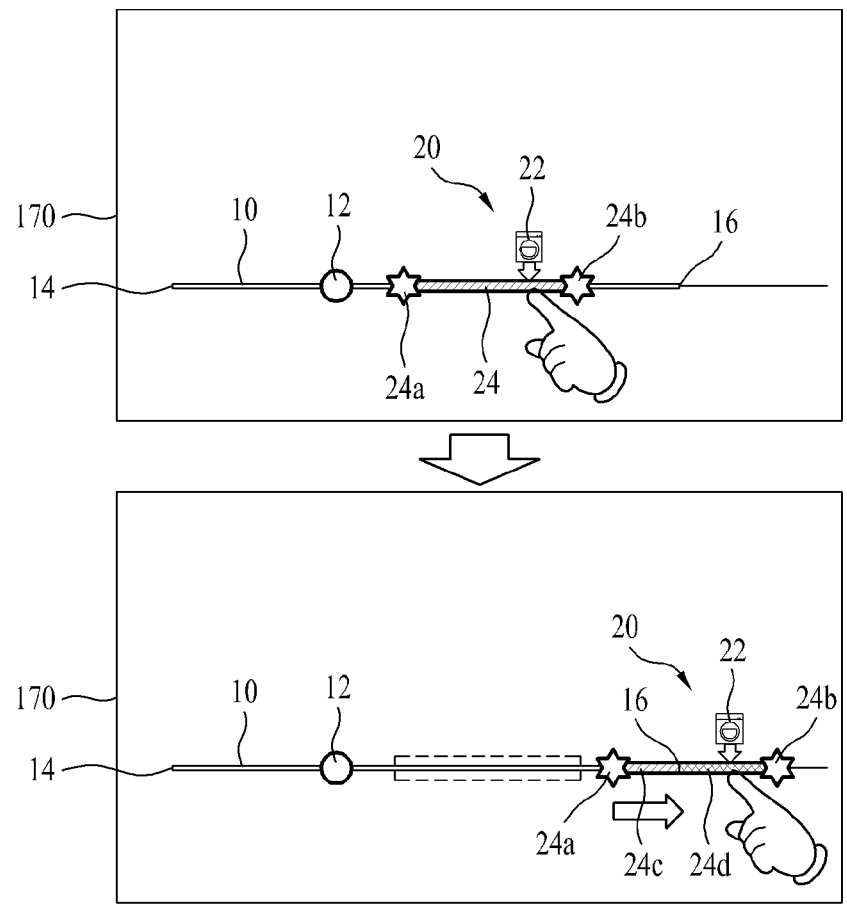
FIGS. 19 to 21 illustrate an exceptional method for operating the timeline UI according to an embodiment of the present invention.
Figure 20:
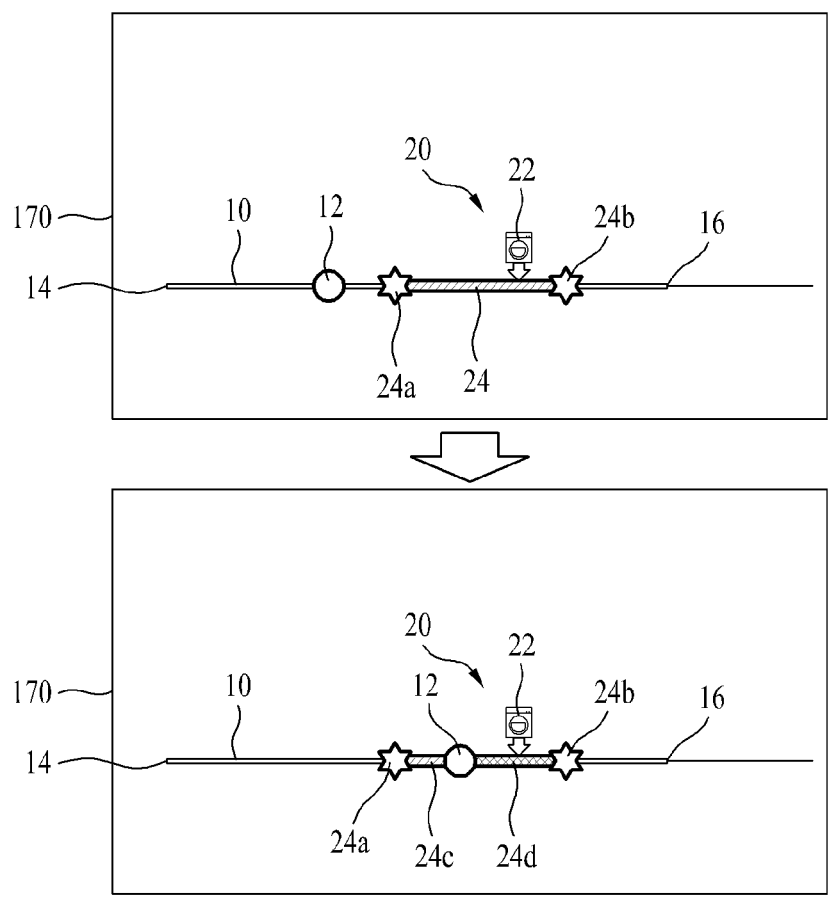
Figure 21:
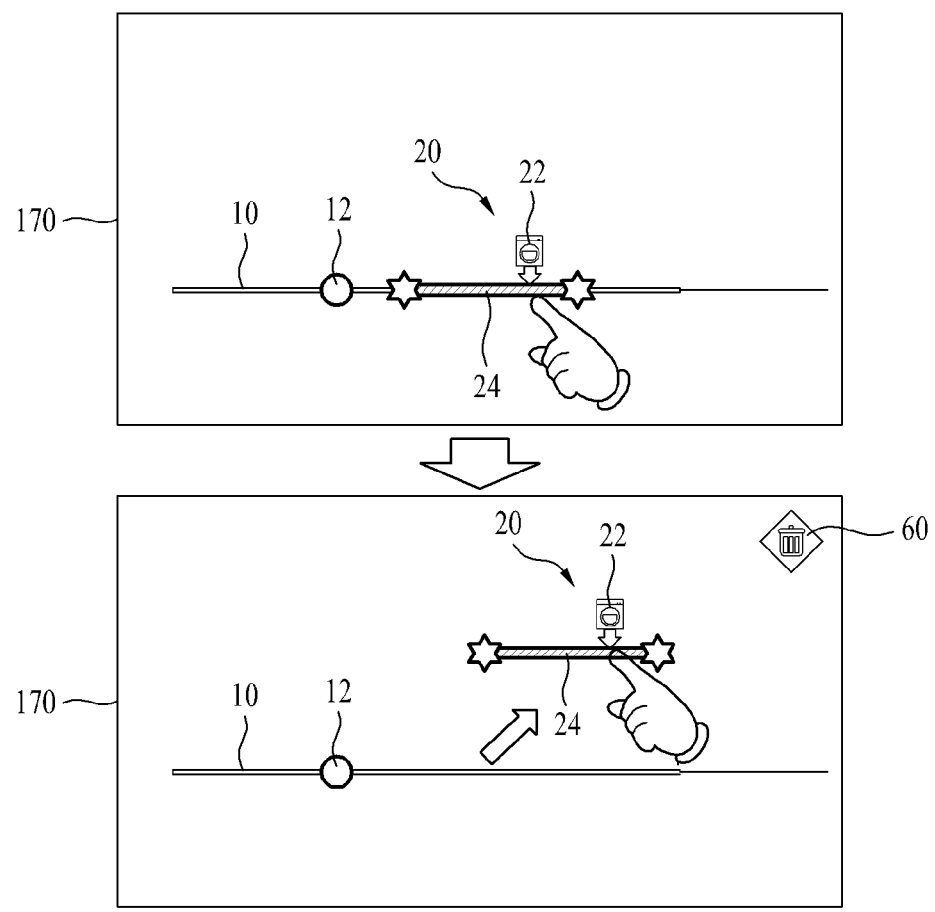

FIGS. 19 to 21 illustrate methods for processing the timeline UI according to embodiments of the present invention.

FIGS. 19 and 20 show embodiments for intuitively representing a correlation between the operation time of the corresponding home device and an operation time of another device or an event occurrence time according to the relative position of the indicator 20. Referring to FIG. 19, the virtual slide bar 24 may pass the point corresponding to the start time 14 or end time 16 of the virtual track 10 as the indicator 20 is moved according to a user input. Accordingly, the virtual slide bar 24 can be divided into a first region 24*c* superimposed on the virtual track 10 and a second region 24*d* that is not superimposed on the virtual track 10. Referring to FIG. 20, at the operation start time of the home device, the progress indicator 12 may be located between the first end 24*a* and the second end 24*b* of the virtual slide bar 24. Accordingly, the virtual slide bar 24 can be divided into two or more regions, that is, first and second regions 24*c* and 24*d*, on the basis of the location of the progress indicator 12. In addition, the virtual slide bar 24 can be divided into two or more regions on the basis of locations of one or more even icons displayed on the virtual track 10 and a location of an indicator of another home device. When the virtual slide bar 24 is divided into two or more regions, display attributes of the respective regions may be different. The display attributes may include effects capable of representing display characteristics, such as a color, shape, pattern, transparency, etc. Therefore, the user can intuitively recognize correlations between the operation time of the home device indicated by the indicator 20 and an operation time of another home device, a specific event occurrence time, and a working time of an operation being executed by the control device.

FIG. 21 shows a case in which the location of the indicator 20 is separated from the virtual track 10 over a predetermined distance according to a user input. The indicator 20 can be moved to a point at a predetermined distance from the virtual track 10 according to a user touch & drag input. In this case, the operation of the home device indicated by the indicator 20 can be interrupted. Otherwise, an operation of the control device to control the home device can be ended, and the home device can operate in an operation mode set before the control operation is ended.

According to another embodiment of the present invention, when the location of the indicator 20 is at longer than a specific distance from the virtual track 10, an indicator trash box icon 60 can be activated on the display unit 170. When the indicator 20 arrives at the indicator trash box icon 60 according to a user input while the indicator trash box icon 60 is in an activated state, the operation of the home device can be interrupted or control of the operation of the home device can be ended, as described above.

Figure 22:
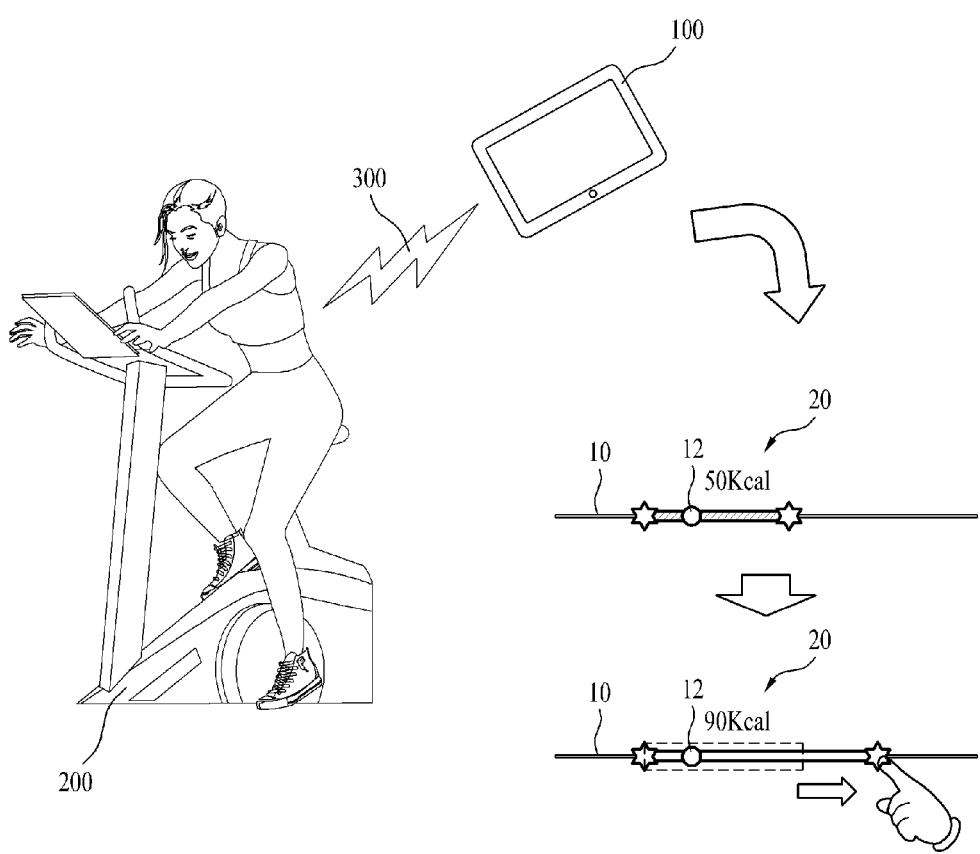
FIG. 22 illustrates an embodiment of controlling a home device using the time UI according to the present invention.

FIG. 22 illustrates an embodiment of controlling a home device using the timeline UI according to the present invention. As shown in FIG. 22, a user can control a working time of the home device 200, for example, bicycle ergometer, which is connected to the control device 100 through a network 300, using the control device 100. That is, the user can control the working time of the bicycle ergometer by moving the indicator 20 that indicates the bicycle ergometer on the virtual track 10. Accordingly, the user can control the working time of the bicycle ergometer in consideration of a playback time of video being displayed on the control device 100. Furthermore, the user can select video to be displayed on the control device 100 with reference to the operation time of the bicycle ergometer, received through the network 300. The indicator 20 may further indicate additional operation information of the bicycle ergometer. For example, the operation information can include the current working mode, total working time, working distance, etc. of the bicycle ergometer. According to the present invention, the user can conveniently obtain operation information of the home device 200 through the control device 100 and control the operation of the home device 200 or the control device 100 by intuitively recognizing the relationship between the operation time of the control device 100 and the operation time of the home device 200.

Figure 23:
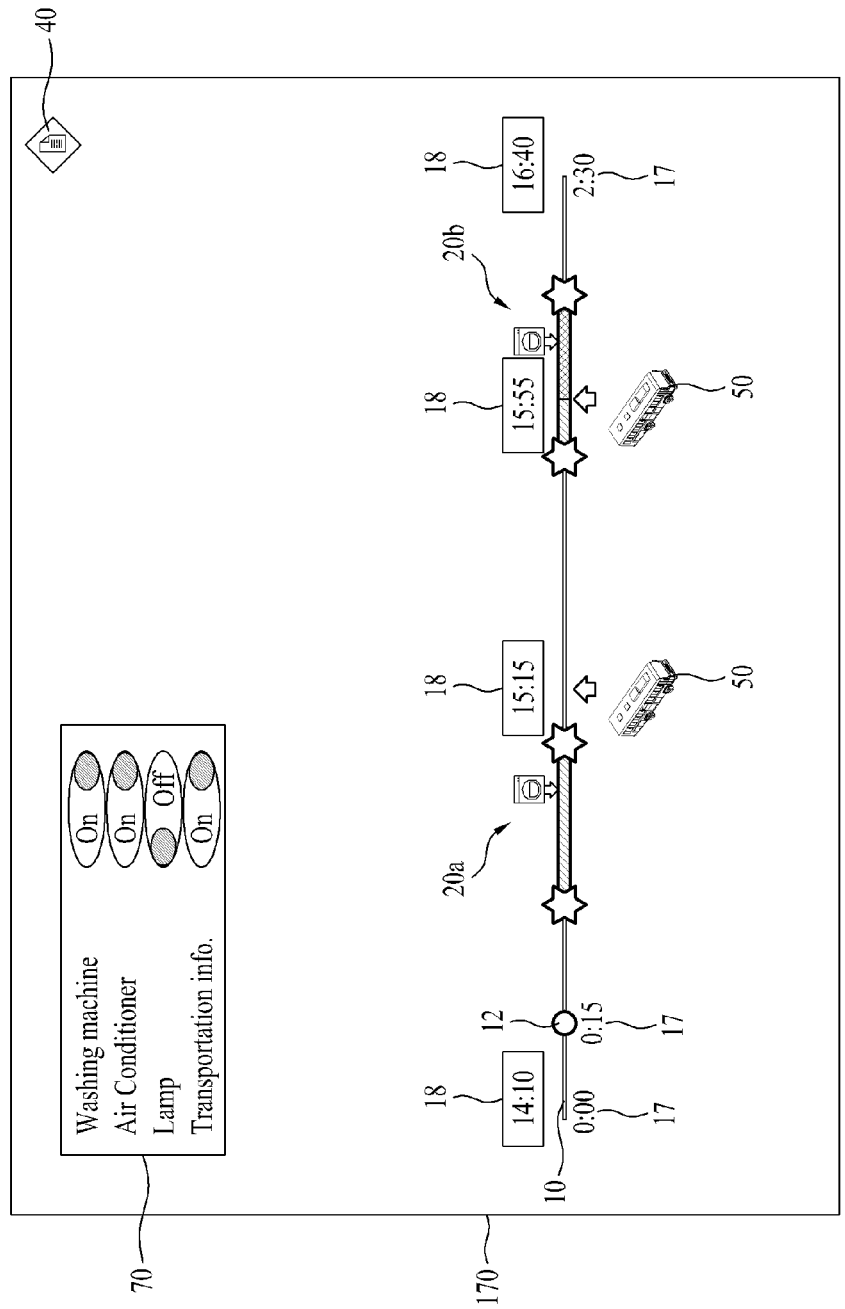
FIG. 23 illustrates integrated operations of the timeline UI according to an embodiment of the present invention.

FIG. 23 shows an integrated timeline UI according to an embodiment of the present invention.

The timeline UI is displayed on the display unit 170 of the control device and includes the virtual track 10 and one or more indicators 20*a* and 20*b* as described above. The indicators 20*a* and 20*b* can include an icon, a virtual slide bar or a combination thereof, as described above, and indicates operation information including operation time information of a corresponding home device. In addition, one or more event icons 50 may be additionally displayed on the virtual track 10. The event icon 50 indicates a time when a specific event is occurred or a time when the specific event is expected to occur. According to this embodiment, when the indicator 20*b* on the virtual track 10 is divided into two or more regions on the basis of locations of the indicator 20*a* of another home device, the progress indicator 12 or the event icon 50, the respective regions of the indicator 20*b* can be expressed in different colors or shapes. Relative time information 17 can be indicated at a point on the virtual track 10, which corresponds to a start time or end time of an operation being executed by the control device, or an arbitrary time, and real-time information 18 can be indicated separately from the relative time information 17.

The timeline UI can display the menu button interface 40 for selecting a home device to be controlled and an operation mode of the home device, as described above, and the indicator that indicates the home device selected through the menu button interface 40 can be activated on the timeline UI. According to another embodiment of the present invention, the timeline UI can further include an indicator display control window 70 for individually determining whether indicators of currently operating home devices are displayed on the virtual track 10. Accordingly, the user can check only operation information of a desired home device from among the currently operating home devices through the timeline UI. For example, referring to FIG. 23, indicators that indicate a washing machine, an air conditioner and transportation information, whose display states are set to 'On' in the indicator display control window 70 can be displayed on the virtual track 10. However, while a lamp whose display state is set to 'Off' in the indicator display control window 70 is actually operating, an indicator corresponding to the lamp may not be displayed on the virtual track 10.

In the embodiments of the present invention, controllable home devices represent devices connected through a network and controllable in a home and may include not only home appliances such as a washing machine, a refrigerator, an electric oven, etc. but also various devices such as a light, door lock, etc. While the timeline UI is controlled according to a touch input or a pointer input in the embodiments of the invention, various methods such as voice, a gesture, etc. can be used to control the timeline UI.

Functions of controlling a controllable home device can include various functions executable in the home device in addition to on/off and start/end time of the home device. For example, the control functions can include a playback/recording function if the home device is a TV receiver, log-on and log-off if the home device is a computer, and volume control, radio reservation tuning and recording when the home device is an audio output device.

As described above, the present invention is totally or partially applicable to electronic devices.

What is claimed is:

1. A method for controlling home devices connected through a network, the method comprising:
   displaying a virtual track on a display unit of a control device, the virtual track corresponding to a timeline indicating a playback time of video which is currently displayed on the display unit of the control device;
   providing an indicator display control window for selecting a specific indicator among at least one indicator which corresponds to at least one home device being at least one home appliance external to the control device, wherein the at least one home device includes at least one of a washing machine, a microwave range, a robot vacuum cleaner, an electric oven, a dish washer, an ice maker and an air conditioner;
   receiving a selection of the specific indicator through the indicator display control window;
   displaying the selected specific indicator along the virtual track when a part of an operation time of a specific home device, which corresponds to the specific indicator, overlaps with the playback time of the video, the specific indicator indicating operation information of the specific home device and the operation information comprising at least one of an operation start time and an operation end time of the specific home device;
   receiving an input signal for moving the specific indicator along the virtual track;
   moving the specific indicator along the virtual track according to the input signal; and
   controlling at least one of the operation start time and the operation end time of the specific home device based on a location of the specific indicator along the virtual track.

2. The method of claim 1, further comprising displaying relative-time information respectively corresponding to a start time and an end time of the video along the virtual track.

3. The method of claim 1, wherein the specific indicator includes at least one of:
   an icon indicating the operation end time of the specific home device, and
   a time window indicating time information which includes at least one of the operation end time of the specific home device and relative time corresponding to the operation end time of the specific home device.

4. The method of claim 1, wherein the specific indicator includes a virtual slide bar having a length corresponding to a total time between the operation start time and the operation end time of the specific home device.

5. The method of claim 4, wherein a first end and a second end of the virtual slide bar respectively correspond to the operation start time and the operation end time of the specific home device, and
   wherein the controlling at least one of the operation start time and the operation end time of the specific home device comprises adjusting at least one of the operation start time and the operation end time of the specific home device based on a user input applied to at least one of the first end and the second end.

6. The method of claim 1, wherein, when the location of the specific indicator is separated from the virtual track over a predetermined distance according to a user input, the operation of the specific home device is interrupted.

7. The method of claim 1, wherein, when the location of the specific indicator is separated from the virtual track over a predetermined distance according to user input, control of the operation of the specific home device is ended.

8. The method of claim 1, further comprising:
   receiving information regarding an expected occurrence time of a specific event through the network; and
   displaying at least one icon indicating the expected occurrence time of the specific event along the virtual track.

9. The method of claim 4, wherein, when the virtual slide bar is segmented into a first region superimposed on the virtual track and a second region that is not superimposed on the virtual track, a display attribute of the second region is adjusted to be different from a display attribute of the first region.

10. The method of claim 9, wherein the display attribute of each of the first and second regions includes at least one of a color, a shape, a pattern, and a transparency.

11. The method claim 1, wherein the operation information of the specific home device further includes operation mode information of the specific home device, and wherein the method further comprises controlling an operation mode of the specific home device based on a user input through the specific indicator located along the virtual track.

12. The method of claim 1, further comprising:

receiving the operation information of the specific home device through the network, wherein the specific indicator is displayed along the virtual track based on the received operation information of the specific home device.

13. A control device for controlling operations of home devices connected to a network, the control device comprising:

a communication unit configured to transmit or receive data to or from the home devices connected to the network;

a processor configured to control operations of the control device; and a display unit configured to display an image based on a command of the processor, wherein the processor is configured to:

display, on the display unit, a virtual track corresponding to a timeline indicating a playback time of video which is currently displayed on the display unit, provide, on the display unit, an indicator display control window for selecting a specific indicator among at least one indicator which corresponds to at least one home device being at least one home appliance external to the control device, wherein the at least one home device includes at least one of a washing machine, a microwave range, a robot vacuum cleaner, an electric oven, a dish washer, an ice maker and an air conditioner, receive a selection of the specific indicator through the indicator display control window, display the selected specific indicator along the virtual track when a part of an operation time of a specific home device, which corresponds to the specific indicator, overlaps with the playback time of the video, the specific indicator indicating operation information of the specific home device, and the operation information comprising at least one of an operation start time and an operation end time of the specific home device, receive an input signal for moving the specific indicator along the virtual track, move the specific indicator along the virtual track according to the input signal, and control at least of the operation start time and the operation end time of the specific home device based on a location of the specific indicator along the virtual track.

14. The control device of claim 13, wherein the processor is further configured to display relative-time information respectively corresponding to a start time and an end time of the video along the virtual track.

15. The control device of claim 13, wherein the specific indicator includes at least one of:

an icon indicating the operation end time of the specific home device, and a time window indicating time information which includes at least one of the operation end time of the specific home device and relative time corresponding to the operation end time of the specific home device.

16. The control device of claim 13, wherein the specific indicator includes a virtual slide bar having a length corresponding to a total time between the operation start time and the operation end time of the specific home device.

17. The control device of claim 16, wherein a first end and a second end of the virtual slide bar respectively correspond to the operation start time and the operation end time of the specific home device, and wherein at least one of the operation start time and the operation end time of the specific home device is adjusted based on a user input applied to at least one of the first end and the second end.

18. The control device of claim 13, wherein, when the location of the specific indicator is separated from the virtual track over a predetermined distance according to a user input, the processor interrupts the operation of the specific home device.

19. The control device of claim 13, wherein, when the location of the specific indicator is separated from the virtual track over a predetermined distance according to a user input, the processor ends control of the operation of specific the home device.

20. The control device of claim 13, wherein the communication unit is configured to receive information regarding an expected occurrence time of a specific event through the network, and wherein the processor is further configured to display at least one event icon indicating the expected occurrence time of the specific event along the virtual track.

21. The control device of claim 16, wherein, when the virtual slide bar is segmented into a first region superimposed on the virtual track and a second region that is not superimposed on the virtual track, the processor is further configured to adjust a display attribute of the second region to be different from a display attribute of the first region.

22. The control device of claim 21, wherein the display attribute of each of the first and second regions includes at least one of a color, a shape, a pattern, and a transparency.

23. The control device of claim 16, wherein the operation information of the specific home device further comprises operation mode information of the specific home device, and wherein the processor is further configured to control an operation mode of the specific home device based on a user input through the specific indicator located along the virtual track.

24. The control device of claim 16, wherein the communication unit receives the operation information of the specific home device through the network, and wherein the processor displays the specific indicator along the virtual track based on the received operation information of the specific home device.

* * * * *